US010549626B2

(12) United States Patent
Kurokawa

(10) Patent No.: US 10,549,626 B2
(45) Date of Patent: Feb. 4, 2020

(54) WORKING VEHICLE

(71) Applicant: YANMAR CO., LTD., Osaka-shi, Osaka (JP)

(72) Inventor: Yoshiaki Kurokawa, Osaka (JP)

(73) Assignee: YANMAR CO., LTD., Osaka (JP)

(*) Notice: Subject to any disclaimer, the term of this patent is extended or adjusted under 35 U.S.C. 154(b) by 17 days.

(21) Appl. No.: 15/278,580

(22) Filed: Sep. 28, 2016

(65) Prior Publication Data

US 2017/0015191 A1 Jan. 19, 2017

Related U.S. Application Data

(63) Continuation of application No. PCT/JP2015/059517, filed on Mar. 26, 2015.

(30) Foreign Application Priority Data

Mar. 28, 2014 (JP) ................................ 2014-069485
Mar. 28, 2014 (JP) ................................ 2014-069486

(51) Int. Cl.
*B60K 11/00* (2006.01)
*B60K 13/04* (2006.01)
(Continued)

(52) U.S. Cl.
CPC ............ *B60K 13/04* (2013.01); *B60R 13/083* (2013.01); *B60S 1/0402* (2013.01); *B62D 25/12* (2013.01); *B60Y 2200/221* (2013.01)

(58) Field of Classification Search
CPC ........ B60K 13/04; B60K 13/02; B60K 11/04; B60K 11/06; B60R 180/083
See application file for complete search history.

(56) References Cited

U.S. PATENT DOCUMENTS 5,125,716 A * 6/1992 Smith .................... B60J 5/0487
296/146.1
5,680,757 A * 10/1997 Pirchl .................... B60K 13/04
180/89.2
(Continued)

FOREIGN PATENT DOCUMENTS

EP 2272703 A1 1/2011
JP 61-032510 U 2/1986
(Continued)

OTHER PUBLICATIONS

Chinese Office Action dated Nov. 20, 2018 issued in corresponding Chinese Application 201580013282.1 cites the patent document above.
(Continued)

*Primary Examiner* — Hau V Phan
(74) *Attorney, Agent, or Firm* — Norton Rose Fulbright US LLP

(57) ABSTRACT

A working vehicle includes an engine mounted in a front portion of a travelling vehicle, and a post-processing device configured to purify exhaust gas from the engine. The engine and the post-processing device are covered with a hood. An upper surface side of the hood is inclined to extend diagonally upward from a front side to a rear side. The post-processing device is mounted on an upper side of the engine, and is positioned on a rear and inner side of the inclined upper surface side of the hood.

16 Claims, 24 Drawing Sheets

(51) Int. Cl.
   *B60R 13/08*   (2006.01)
   *B60S 1/04*   (2006.01)
   *B62D 25/12*   (2006.01)

(56) References Cited

U.S. PATENT DOCUMENTS

| | | | | |
|---|---|---|---|---|
| 7,458,434 B2* | 12/2008 | Samejima | ............... | A01D 34/82 |
| | | | | 180/68.1 |
| 7,559,295 B2* | 7/2009 | Yamada | ................... | F01P 5/06 |
| | | | | 123/41.31 |
| 7,972,708 B2 | 7/2011 | Schweiggart et al. | | |
| 8,857,557 B2* | 10/2014 | Sakamoto | ............. | B60K 11/04 |
| | | | | 180/296 |
| 8,905,182 B2* | 12/2014 | Masumoto | ............. | B60K 11/06 |
| | | | | 180/309 |
| 2002/0017408 A1 | 2/2002 | Oshikawa et al. | | |
| 2006/0005340 A1 | 1/2006 | Boyce | | |
| 2008/0289902 A1* | 11/2008 | Krus | ................... | B60R 13/0838 |
| | | | | 181/290 |
| 2010/0181127 A1* | 7/2010 | Braun | .................... | B60K 13/02 |
| | | | | 180/68.1 |
| 2010/0326755 A1 | 12/2010 | Husson et al. | | |
| 2011/0167808 A1* | 7/2011 | Kosaka | ............... | F01N 13/1822 |
| | | | | 60/311 |
| 2011/0272202 A1* | 11/2011 | Kawashiri | ............. | B62D 25/10 |
| | | | | 180/69.21 |
| 2013/0186077 A1* | 7/2013 | Morimoto | ................. | F01N 3/00 |
| | | | | 60/324 |
| 2014/0020972 A1 | 1/2014 | Masumoto et al. | | |

FOREIGN PATENT DOCUMENTS

| | | |
|---|---|---|
| JP | H01-037146 Y | 11/1989 |
| JP | 2004-314732 A | 11/2004 |
| JP | 2005-231533 A | 9/2005 |
| JP | 2010-042779 A | 2/2010 |
| JP | 2010-149765 A | 7/2010 |
| JP | 2010-264800 A | 11/2010 |
| JP | 2011-047390 A | 3/2011 |
| JP | 2011-126342 A | 6/2011 |
| JP | 2012-201158 A | 10/2012 |
| JP | 2013-018325 A | 1/2013 |
| JP | 2013-116692 A | 6/2013 |
| JP | 2014-031053 A | 2/2014 |

OTHER PUBLICATIONS

Chinese Office Action dated Apr. 16, 2018 to corresponding Chinese Patent Application No. 201580013282.1, citing patent documents listed above.

Korean Office Action dated Jun. 13, 2019 to corresponding Korean Patent Application No. 10-2016-7020377, citing patent documents listed above.

* cited by examiner

WORKING VEHICLE

CROSS-REFERENCE TO RELATED APPLICATIONS

The present application is a continuation application of International Application No. PCT/JP2015/59517, filed Mar. 26, 2015, which claims priority to Japanese Patent Application No. 2014-69485, filed Mar. 28, 2014, and Japanese Patent Application No. 2014-69486, filed Mar. 28, 2014. The contents of these applications are incorporated herein by reference in their entirety.

BACKGROUND OF THE INVENTION

The present invention relates to a working vehicle.

Recently, there has been a requirement for agricultural machines, construction machines, ships, and the like, on which a diesel engine is mounted, to have a post-processing device installed, due to a strict exhaust gas regulation applied to diesel engines. Such a post-processing device includes an exhaust gas purification device that performs purification processing for air pollutant in exhaust gas. Thus, some conventional working vehicles such as a tractor have an exhaust gas purification device disposed in an engine room below a hood together with a diesel engine (see Japanese Unexamined Patent Application Publication No. 2013-116692).

In some other working vehicles such as a tractor, a fuel tank storing fuel to be supplied to an engine is formed as a pair of fuel tanks respectively disposed on left and right sides of a vehicle body so as to provide a space for an engine, a transmission, and the like (see Japanese Unexamined Patent Application Publication No. 2010-042779).

SUMMARY OF THE INVENTION

In a working vehicle, such as a tractor employing a diesel engine including the exhaust gas treating device described above, not only the diesel engine and the exhaust gas treating device but also various parts need to be packed in a limited and small installation space. Such parts include a radiator, a battery, and electronic parts for the exhaust gas treating device.

In the installation space in the working vehicle, the diesel engine being driven produces heat which raises its temperature, and further raises the temperature of the exhaust gas purification device to be quite high. Thus, the temperature in the engine room needs to be adjusted to offset the adverse effect of the heat produced from the diesel engine and the exhaust gas treating device. Furthermore, a structure appropriate for arranging parts and a cooling structure need to be reviewed. Heating of a driver's seat behind the engine room needs to be kept in a reasonable range for the sake of comfortability of an operator. The disposed position of the fuel tank is limited, and thus an increase in the entire capacity of the fuel tank cannot be pursued over a certain level, and can even lead to a shape hindering the operator entering and exiting the tractor.

A technical object of the present invention is to provide a working vehicle improved in view of the situation described above.

A first aspect of the present invention provides a working vehicle including: an engine mounted in a front portion of a travelling vehicle, and a post-processing device configured to purify exhaust gas from the engine. The engine and the post-processing device are covered with a hood. An upper surface side of the hood is inclined to extend diagonally upward from a front side to a rear side. The post-processing device is mounted on an upper side of the engine, and is positioned on a rear and inner side of the inclined upper surface side of the hood.

A second aspect of the present invention provides the working vehicle according to the first aspect in which a driving shaft of a wiper configured to perform a wiping operation for a windshield covering a front surface of a cabin installed in the travelling vehicle may be covered by a rear portion of the upper surface of the hood in front view.

A third aspect of the present invention provides the working vehicle according to the first aspect in which a heat shield plate may be disposed between the hood and the post-processing device.

A fourth aspect of the present invention provides the working vehicle according to the third aspect in which the heat shield plate may be disposed on a lower side of the upper surface inclined portion of the hood, and cover an upper surface of each of the engine and the post-processing device.

A fifth aspect of the present invention provides the working vehicle according to the third aspect that may further include a hood shield plate that is disposed on a rear surface side of the hood, and is configured to cover at least a rear surface of the post-processing device, in which a gap may be provided between the hood shield plate and the heat shield plate.

According to the embodiment of the invention of the present application, the post-processing device is positioned on a rear inner side of the inclined upper surface side of the hood. Thus, a large space for accommodating the post-processing device can be formed in the hood. Furthermore, a space serving as a heat insulation layer can be formed between the heat shield plate and the hood. Thus, a high temperature environment can be achieved around the post-processing device while preventing heat from negatively affecting the outside of the engine room. All things considered, an excellent heat balance can be achieved in the hood. The driving shaft of the wiper is covered with the rear portion of the upper surface of the hood. Thus, rain drops can be prevented from directly coming into contact with the driving shaft and a driving mechanism of the wiper, and a better appearance of the working vehicle can be achieved.

The heat shield plate is disposed above the post-processing device so that the hood can be prevented from being heated by the heat discharged from the post-processing device and the engine. The space is formed between the hood and the heat shield plate so that the inner side of the engine room below the heat shield plate is thermally insulated from the outer air, whereby the post-processing device can operate in a high temperature environment. The heat from the engine room below the hood is shielded with the hood shield plate. Thus, the drivers' seat can be prevented from being heated by the heat discharged from the engine room. With the hood shield plate and the heat shield plate disposed with a gap in between, the heat is less likely to accumulate in the engine room. Thus, the post-processing device can be prevented from being negatively affected by its own heat or from negatively affecting the hood or the like by the heat discharged therefrom.

The heat from the engine room below the hood is shielded with the hood shield plate. Thus, the driver's seat can be prevented from being heated by the heat discharged from the engine room. Thus, the operator on the driver's seat can comfortably operate the vehicle without being negatively affected by the heat discharged from the engine and the post-processing device.

DESCRIPTION OF THE EMBODIMENTS

Figure 1:
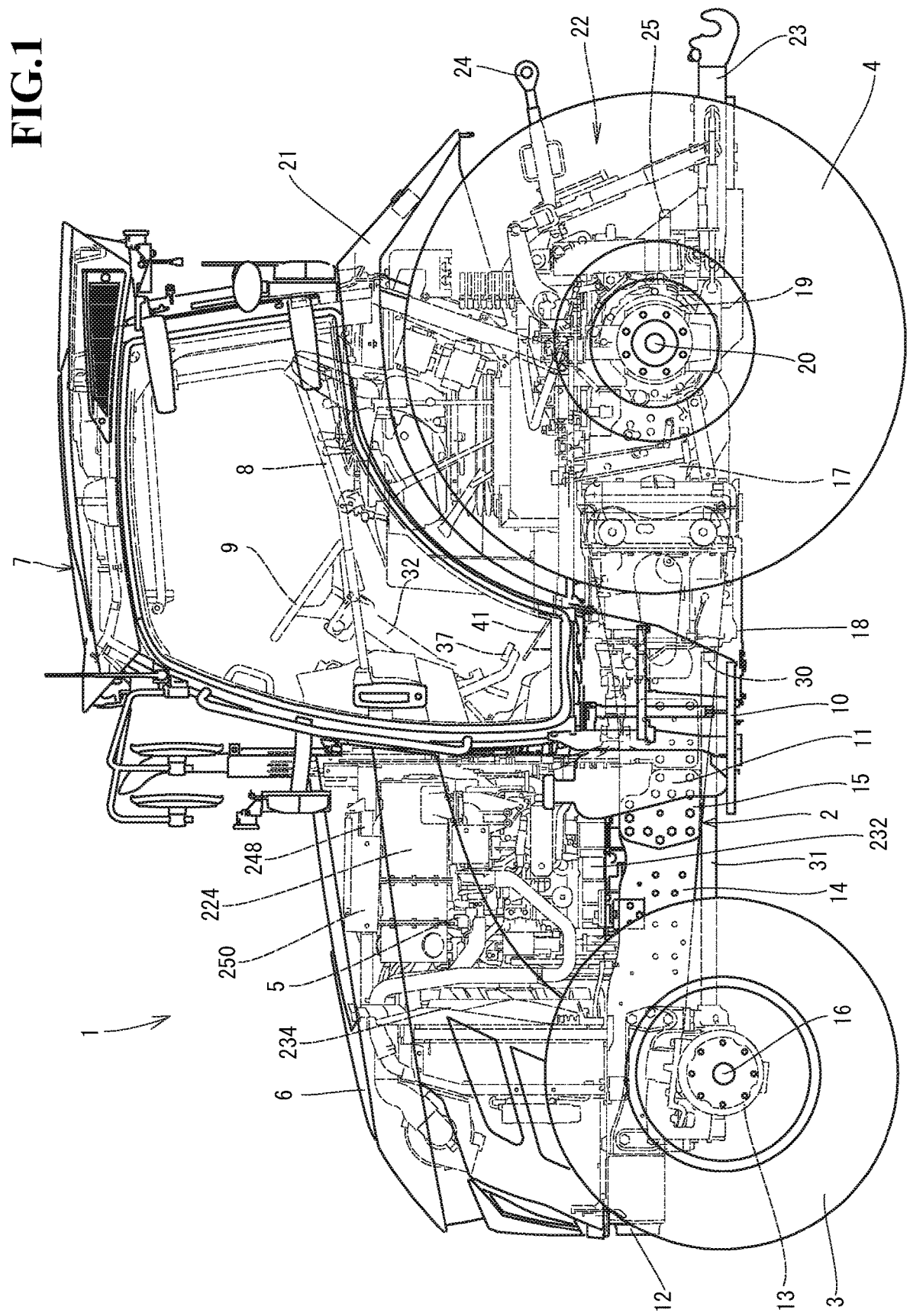
FIG. 1 is a left side view of a tractor.
Figure 2:
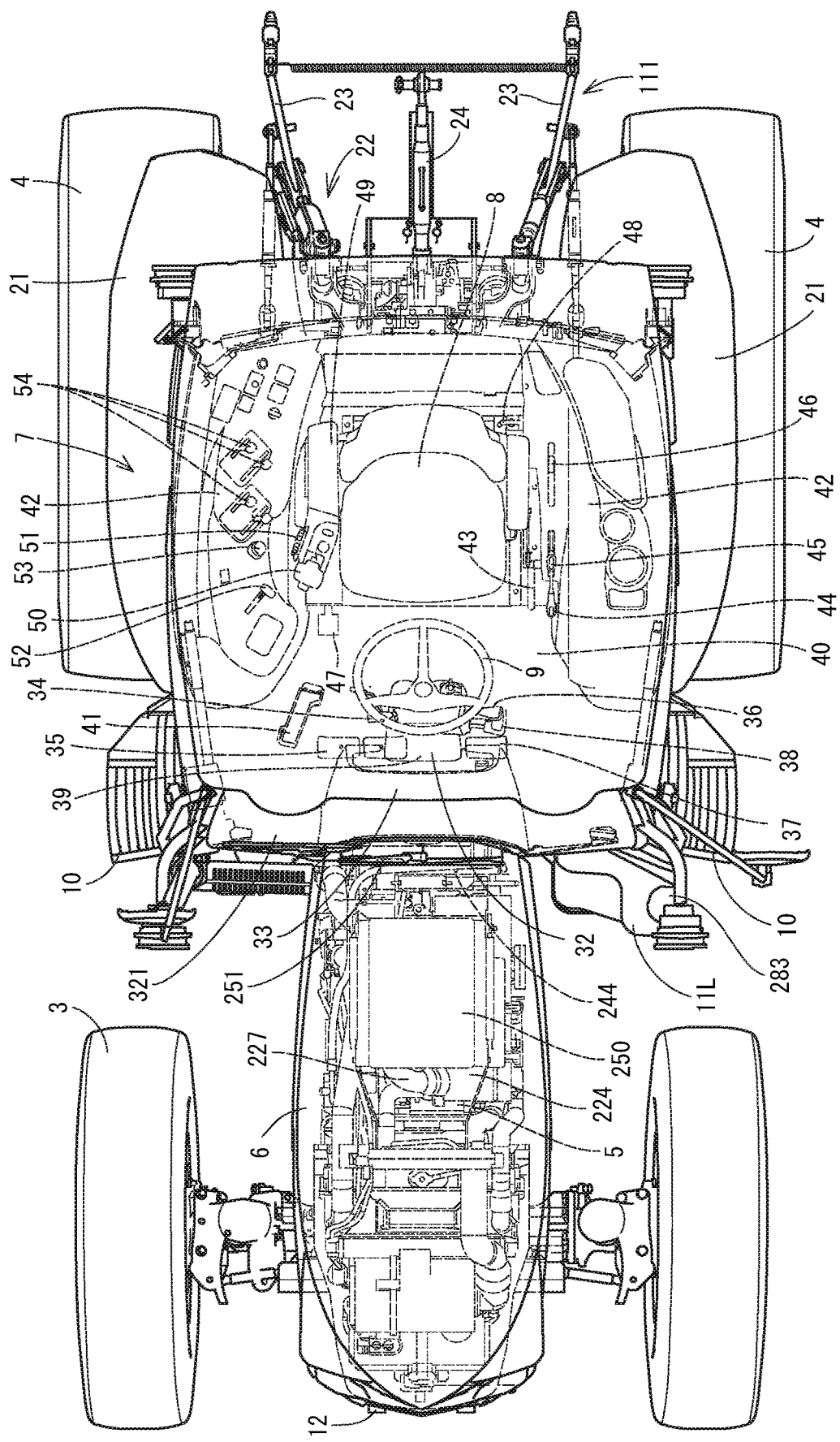
FIG. 2 is a plan view of the tractor.
Figure 3:
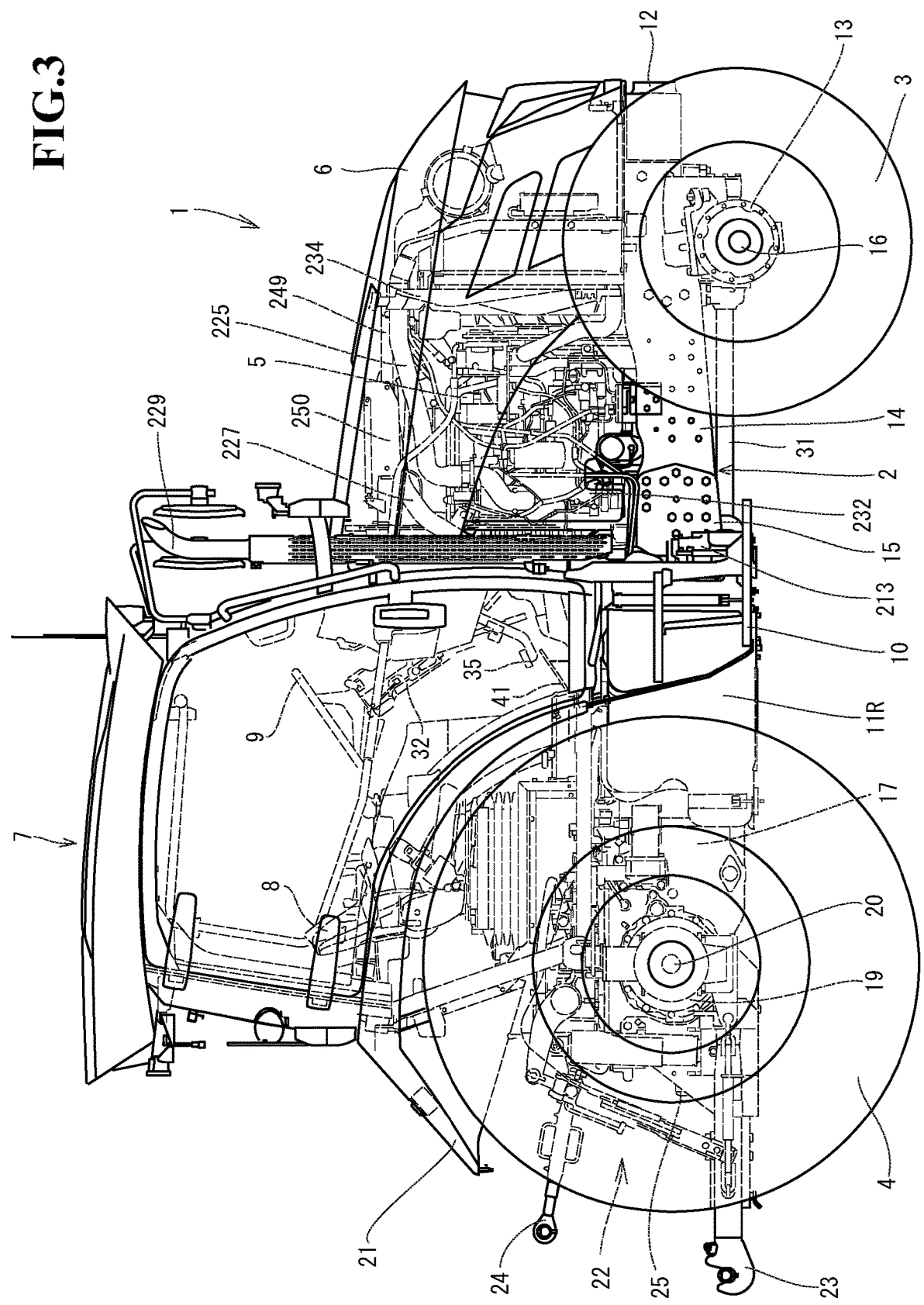
FIG. 3 is a right side view of the tractor.
Figure 4:
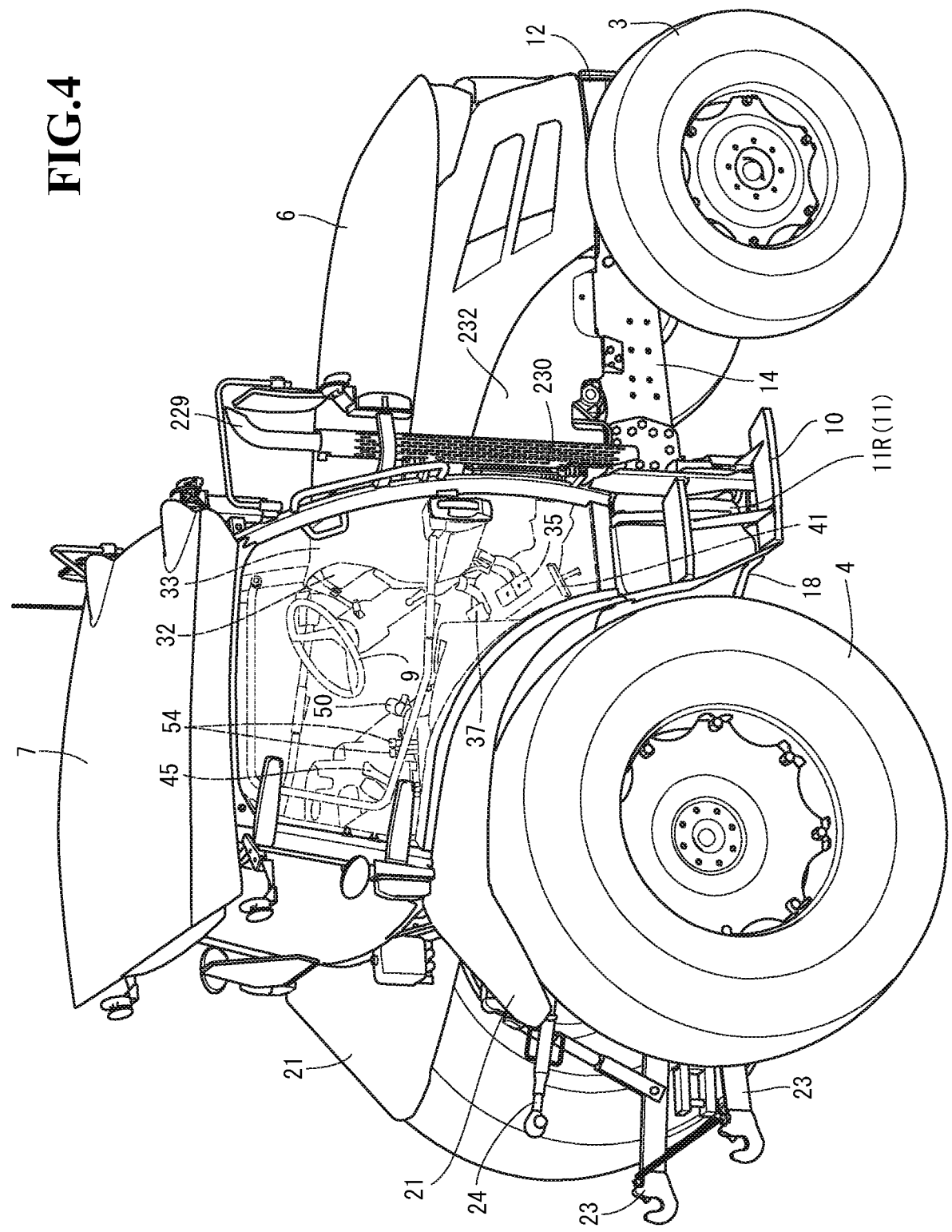
FIG. 4 is a perspective view illustrating the tractor as viewed in a diagonal direction from a lower right side.
Figure 5:
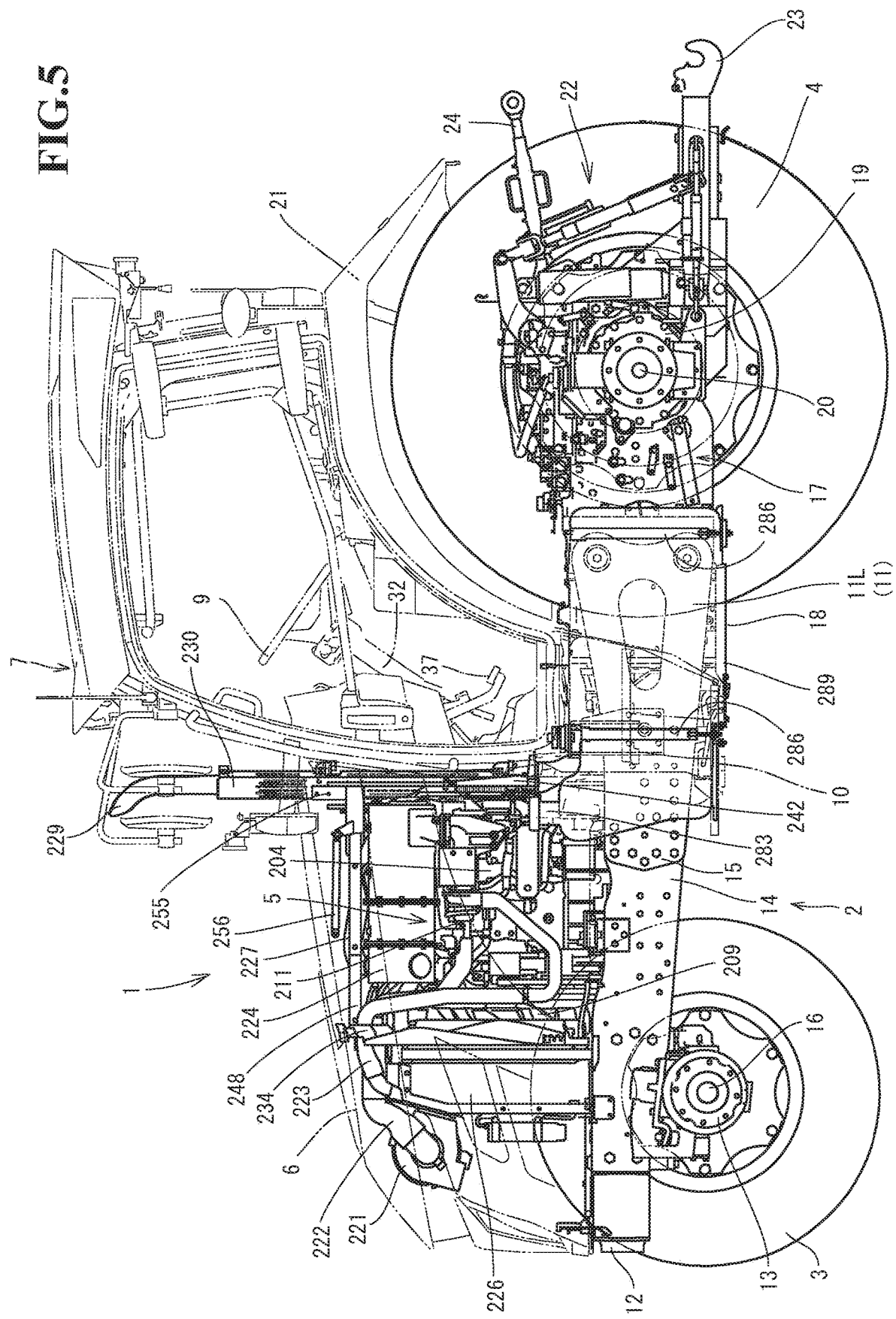
FIG. 5 is a left side view illustrating a travelling vehicle.
Figure 6:
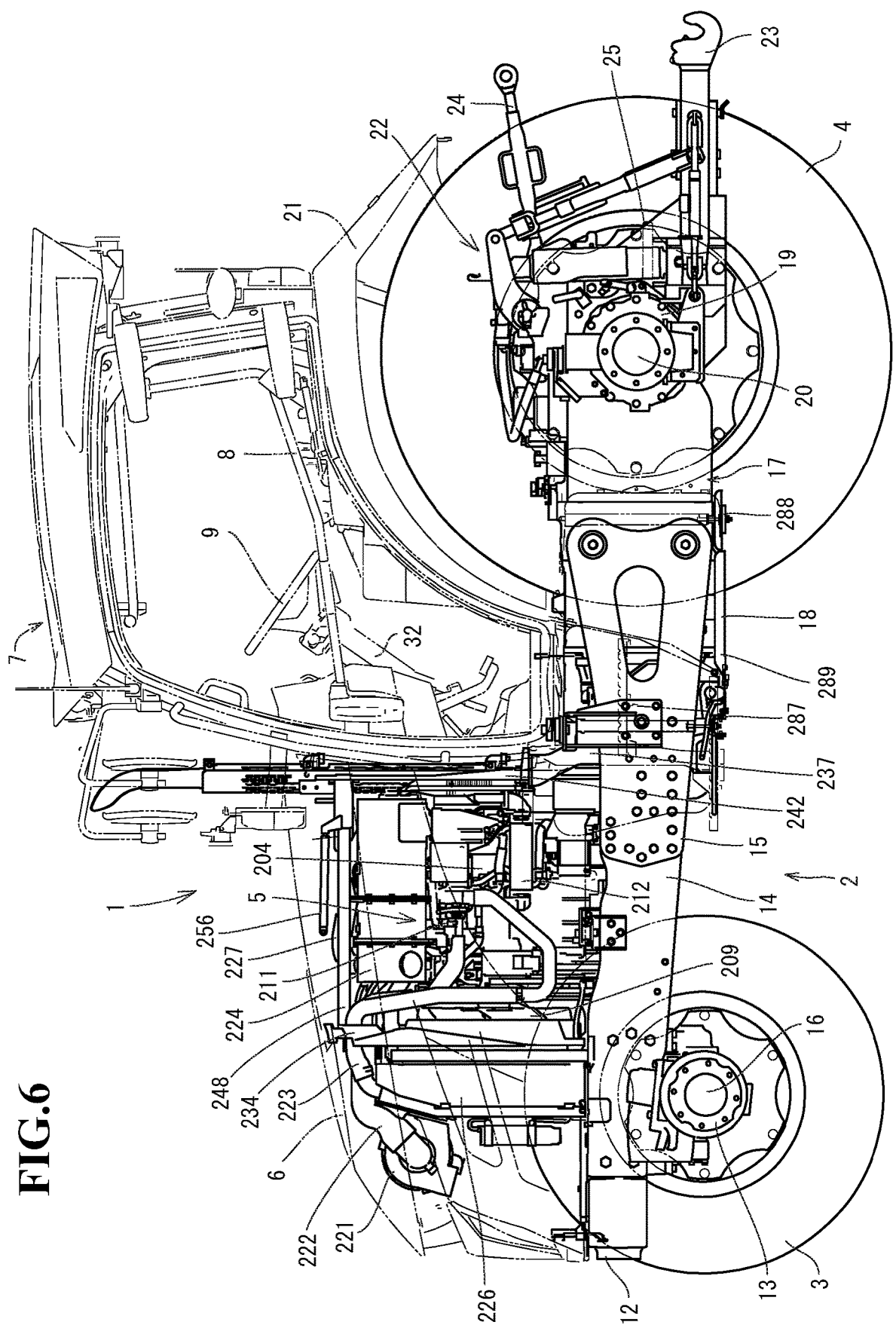
FIG. 6 is a left side view illustrating a structure of the travelling vehicle in detail.
Figure 7:
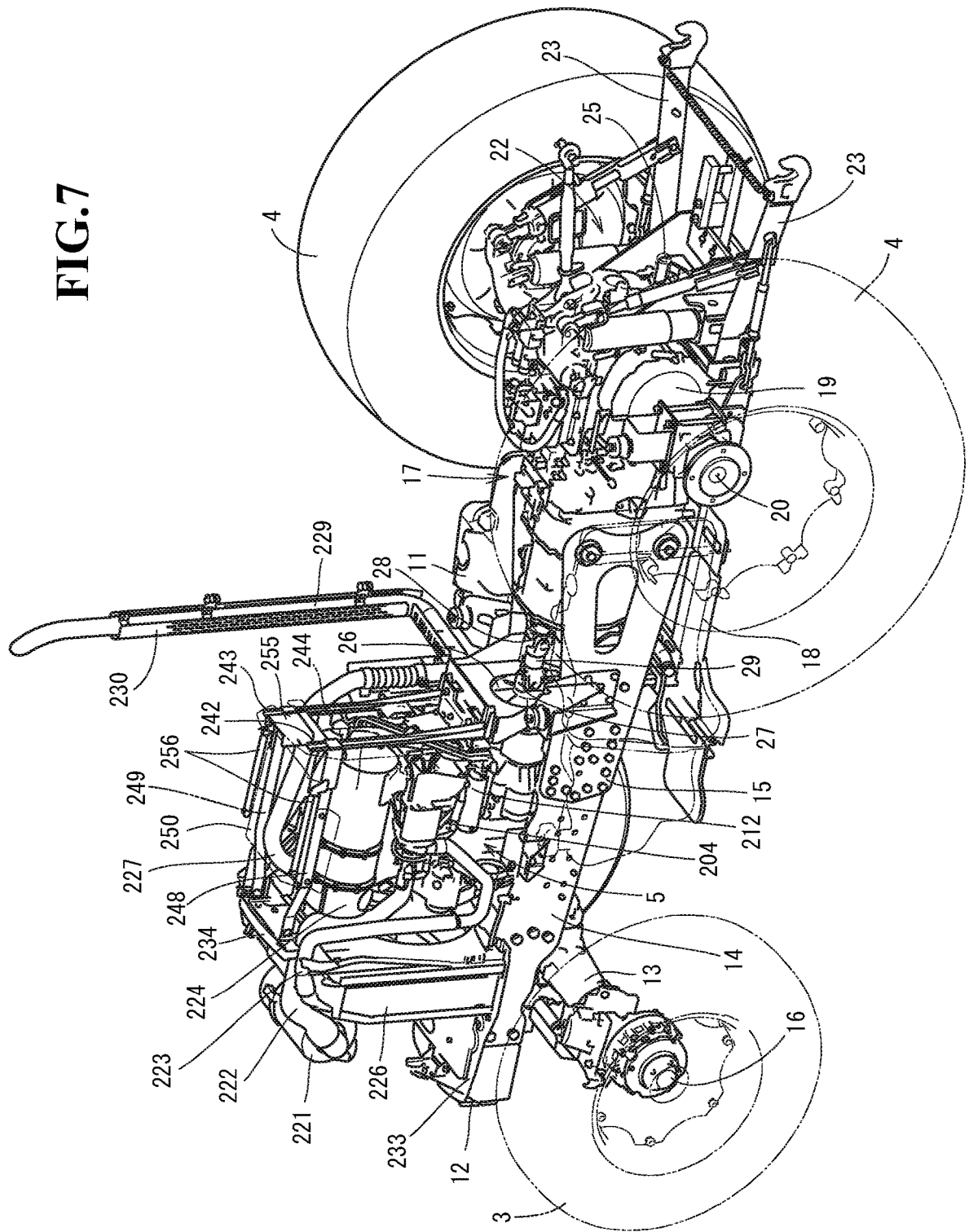
FIG. 7 is a perspective view illustrating the travelling vehicle as viewed in a diagonal direction from a lower left side.
Figure 8:
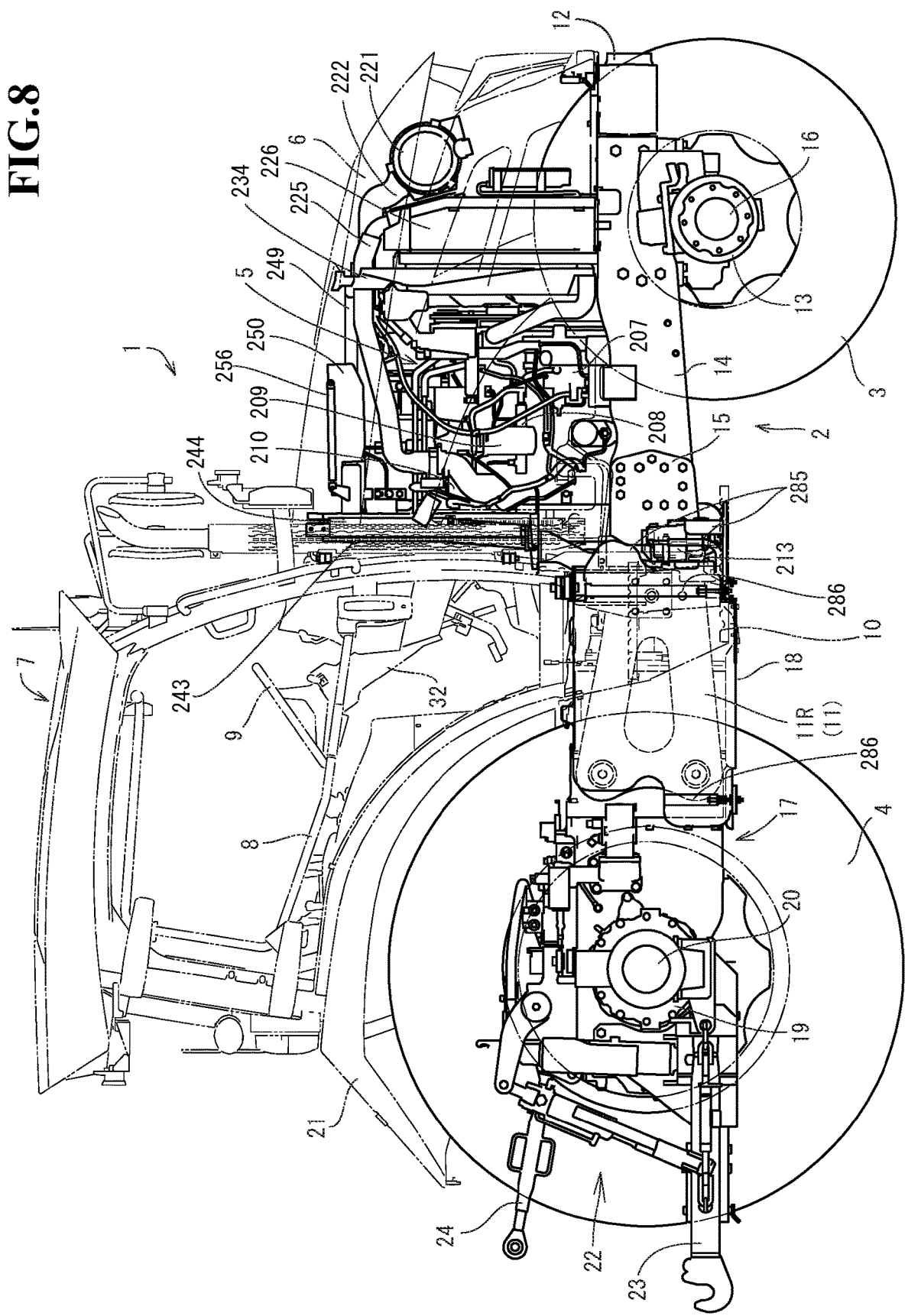
FIG. 8 is a right side view of the travelling vehicle.
Figure 9:
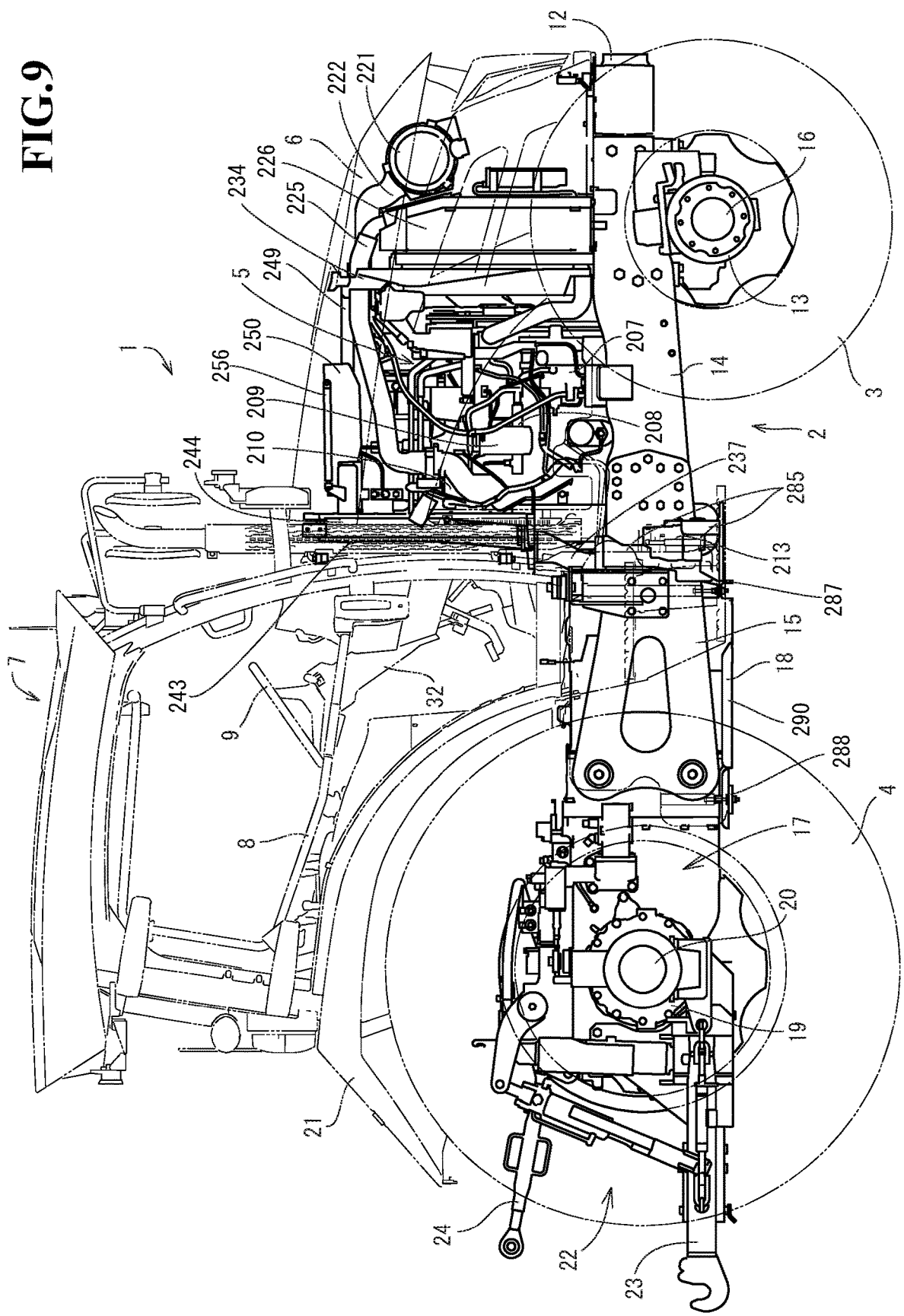
FIG. 9 is a right side view illustrating a structure of the travelling vehicle in detail.
Figure 10:
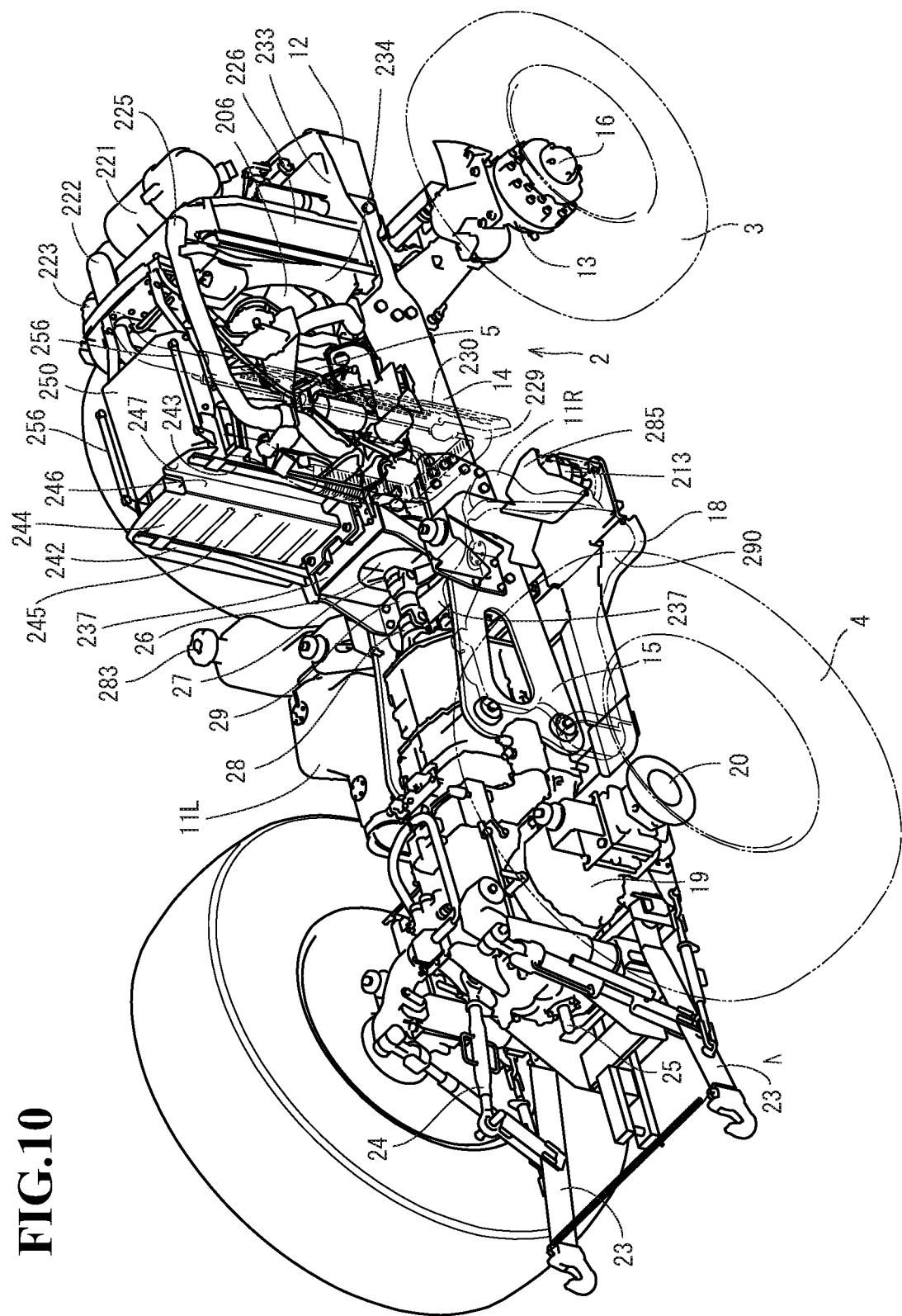
FIG. 10 is a perspective view illustrating the travelling vehicle as viewed in a diagonal direction from a rear right side.
Figure 11:
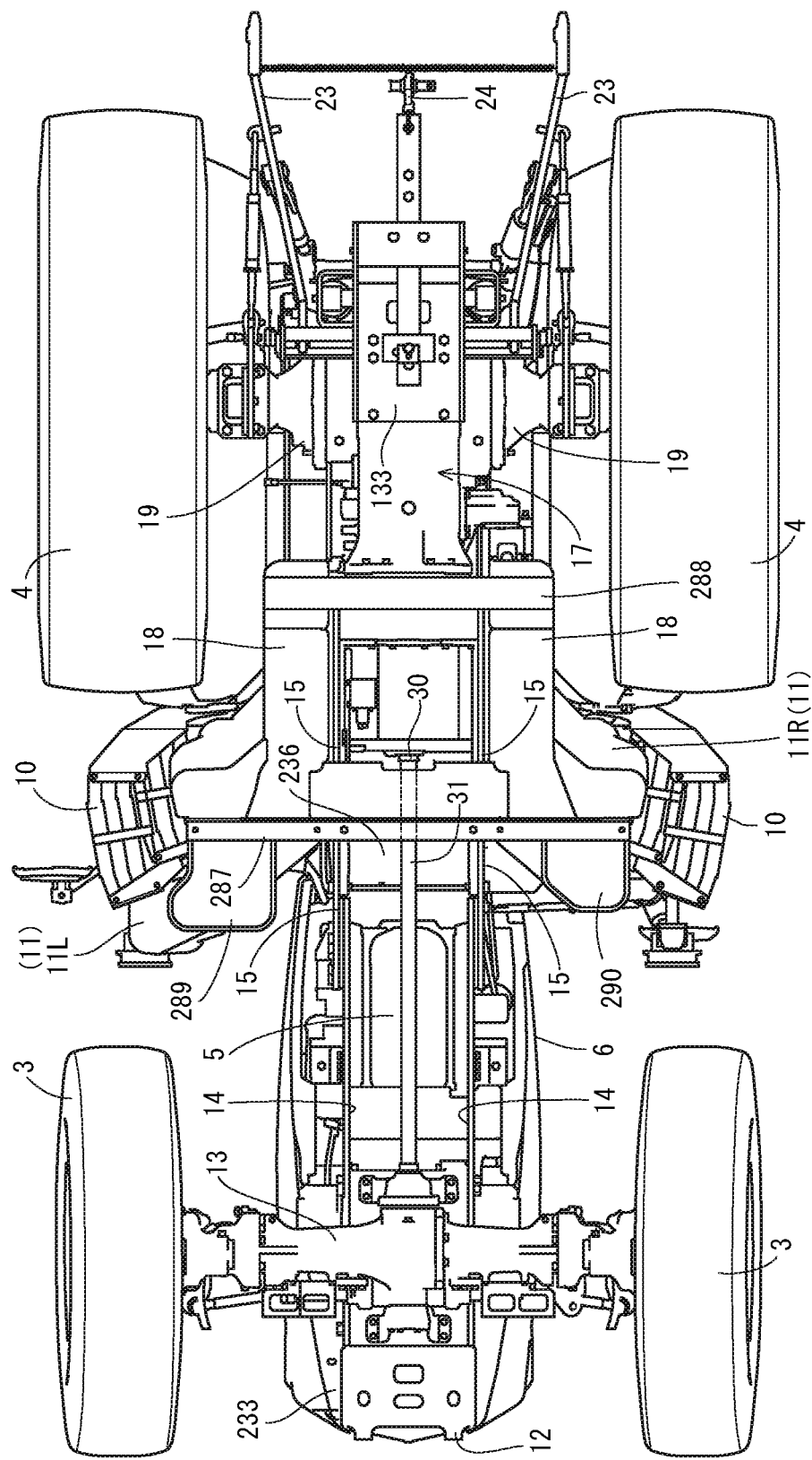
FIG. 11 is a bottom view of the tractor.
Figure 12:
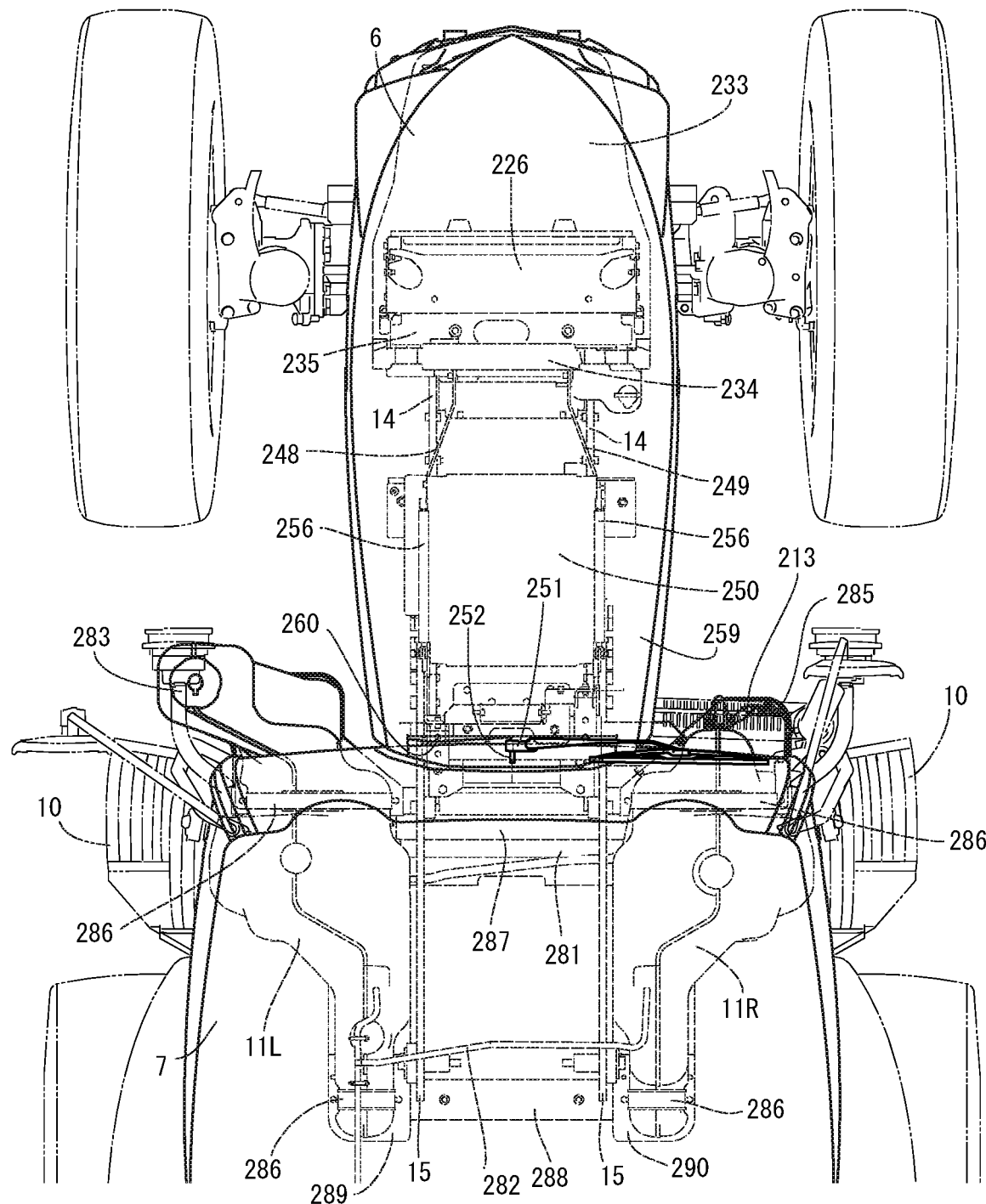
FIG. 12 is an enlarged plan view of the tractor.
Figure 13:
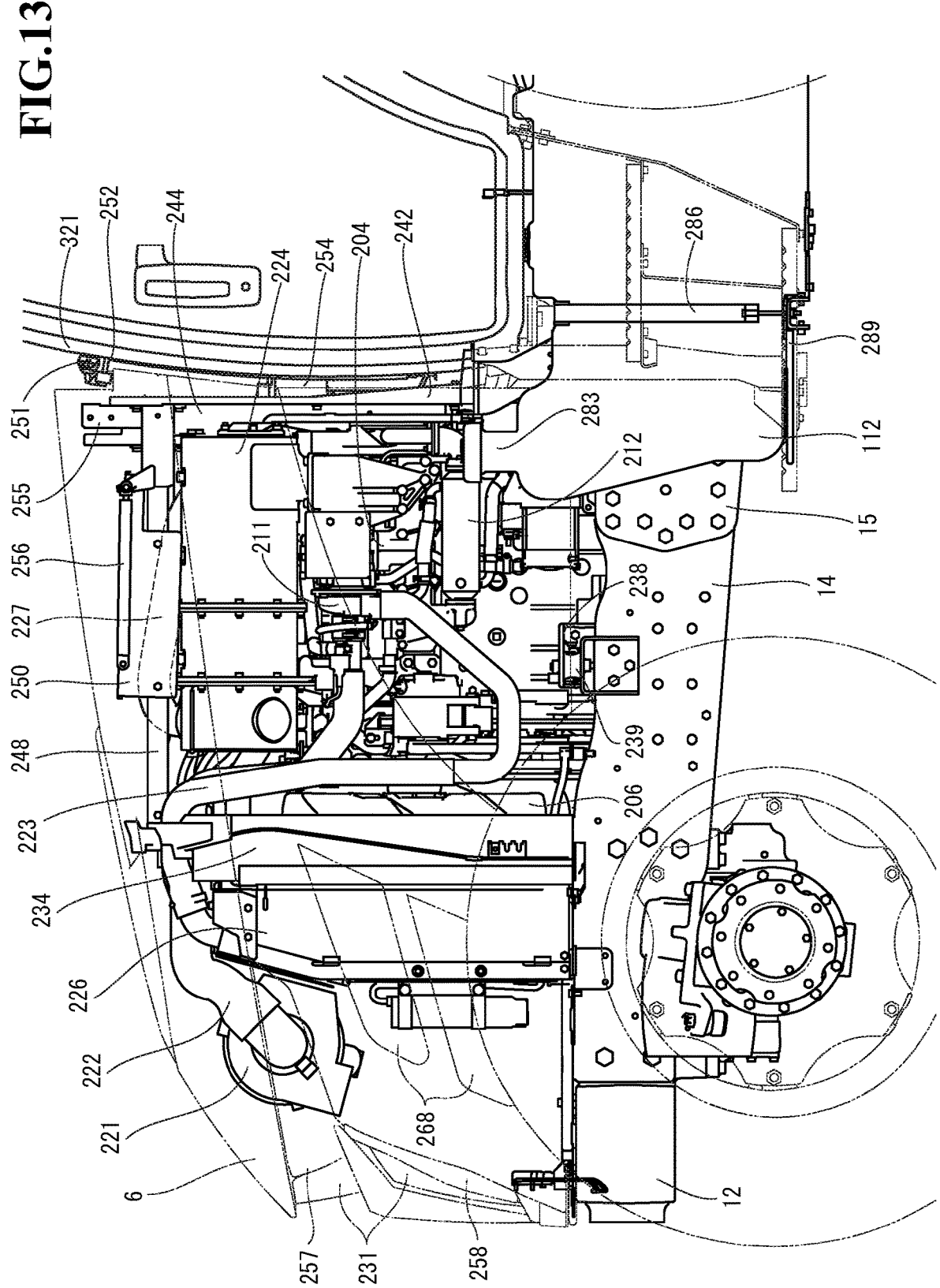
FIG. 13 is an enlarged left side view of the tractor.
Figure 14:
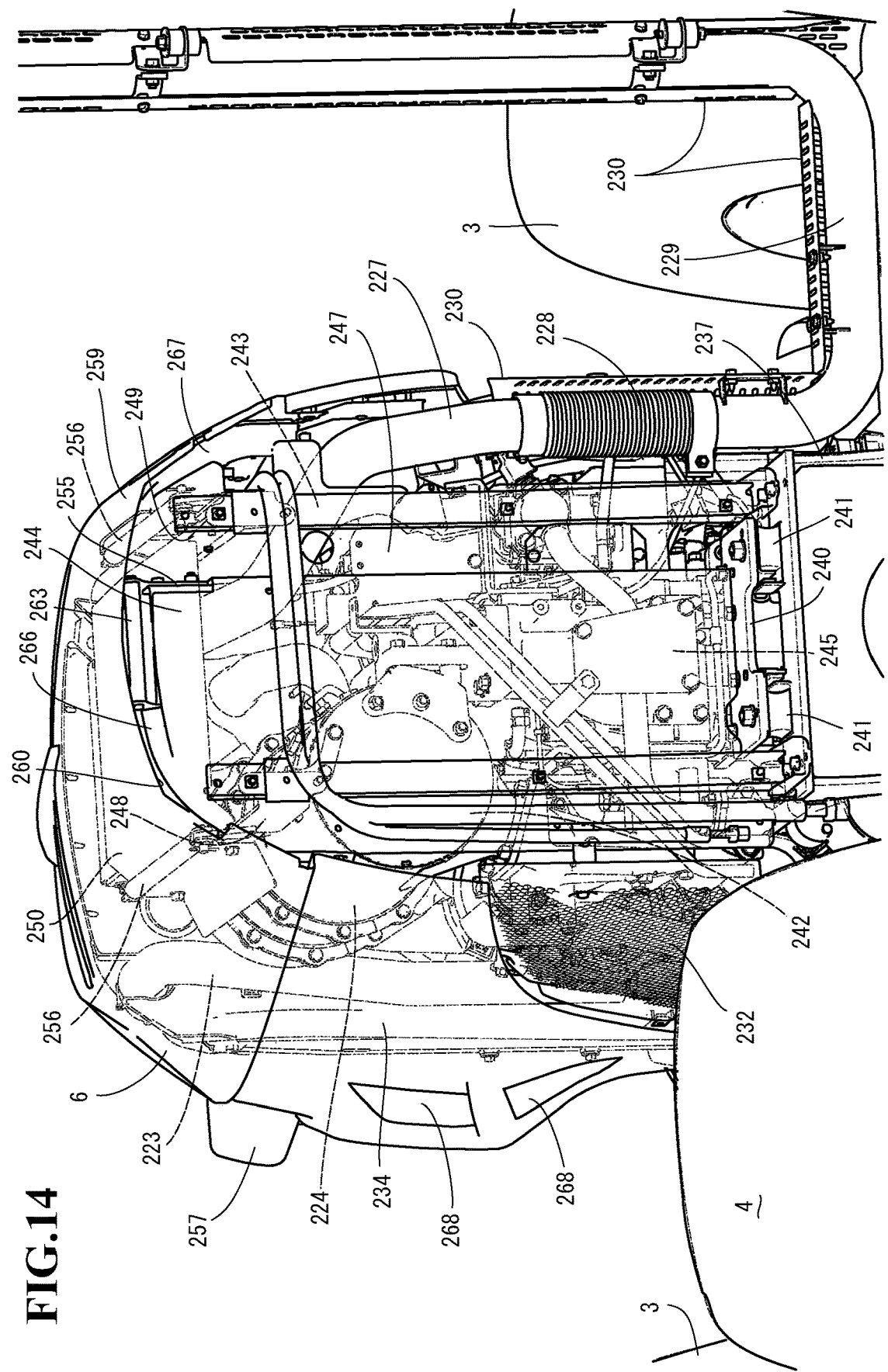
FIG. 14 is a perspective view illustrating a hood rear surface structure as viewed from a side of a cabin.
Figure 15:
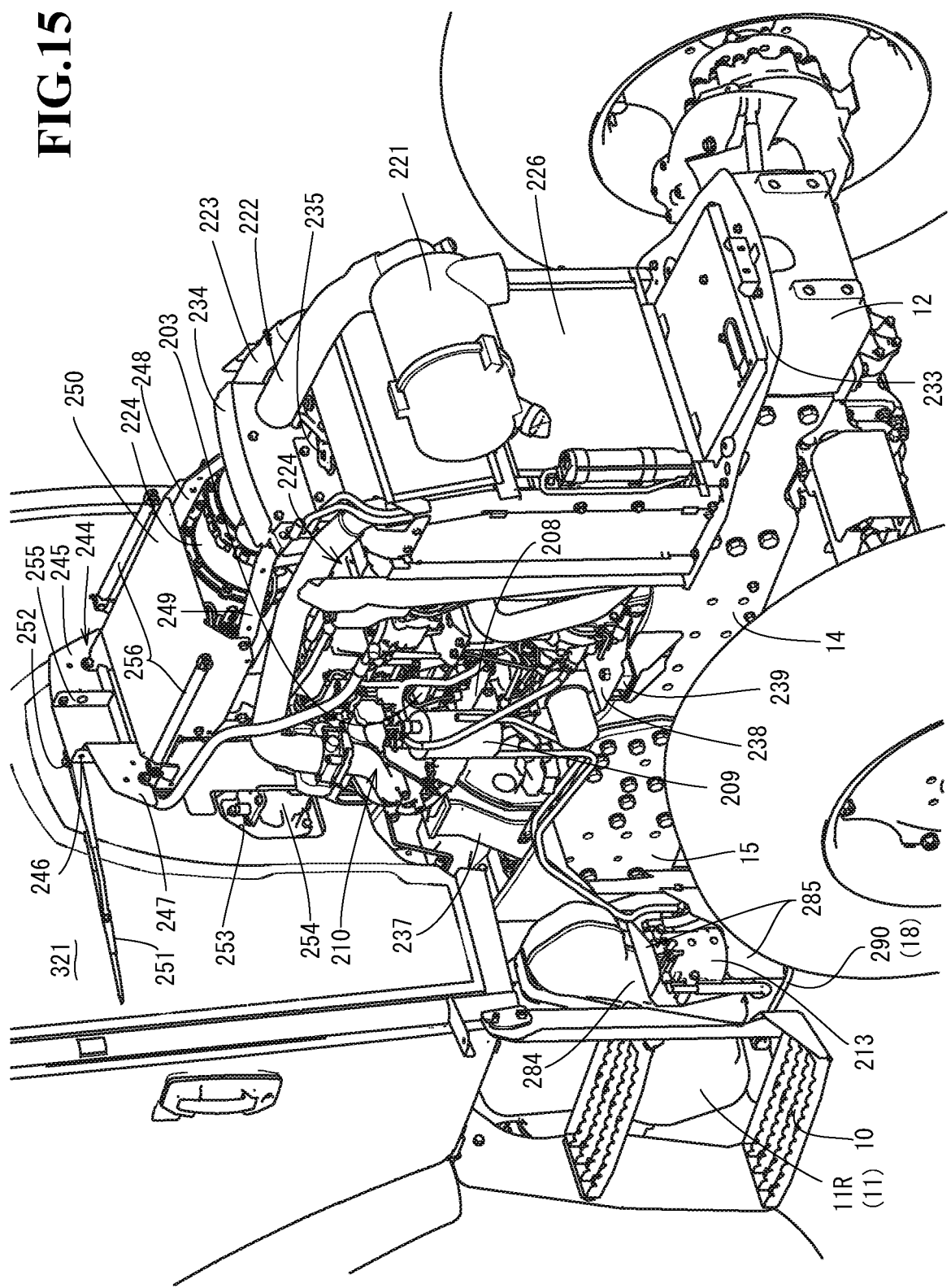
FIG. 15 is a perspective view illustrating the travelling vehicle as viewed in a diagonal direction from a front right side.
Figure 16:
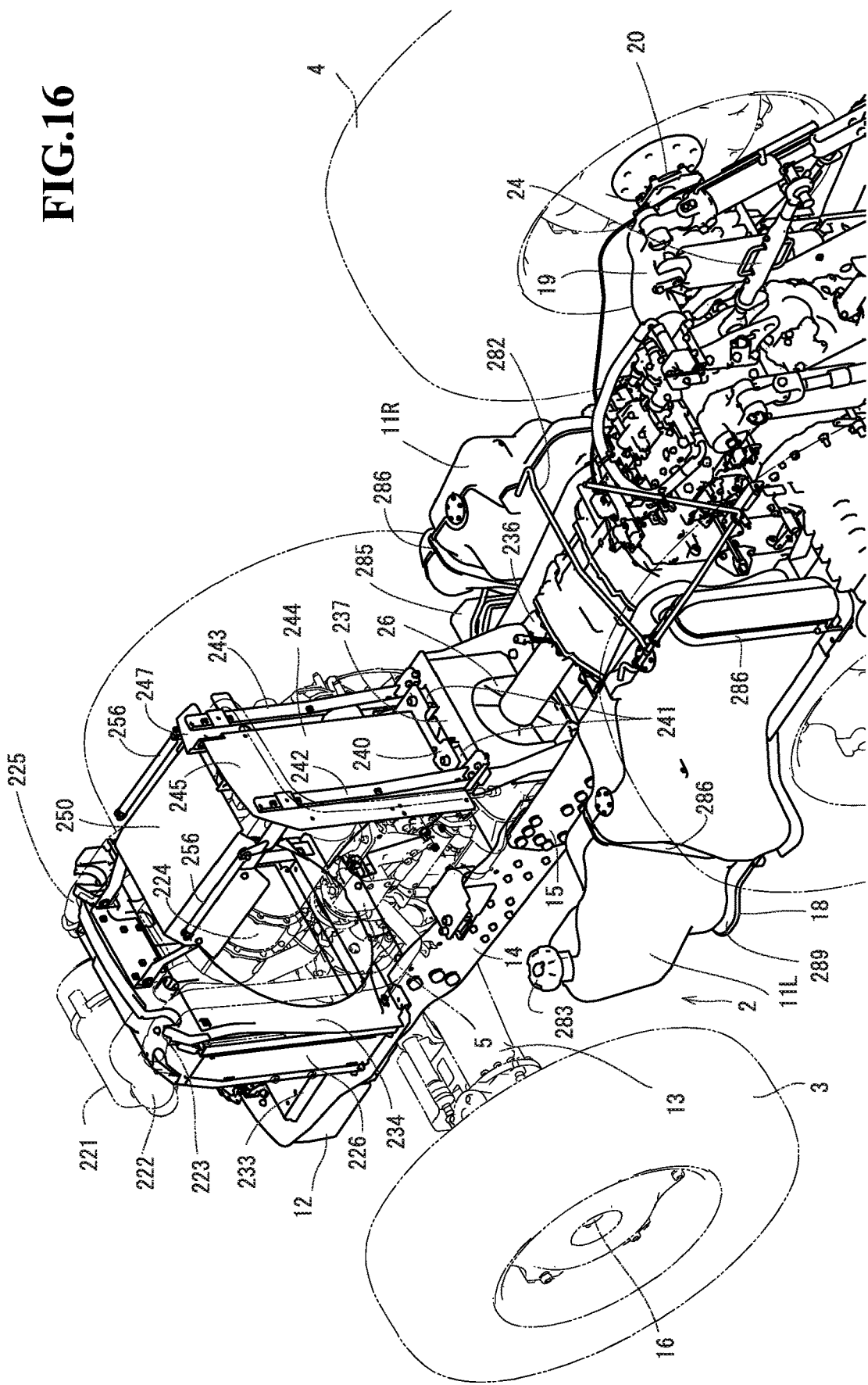
FIG. 16 is a perspective view illustrating an internal structure of an engine room as viewed in a diagonal direction from a rear left side.
Figure 17:
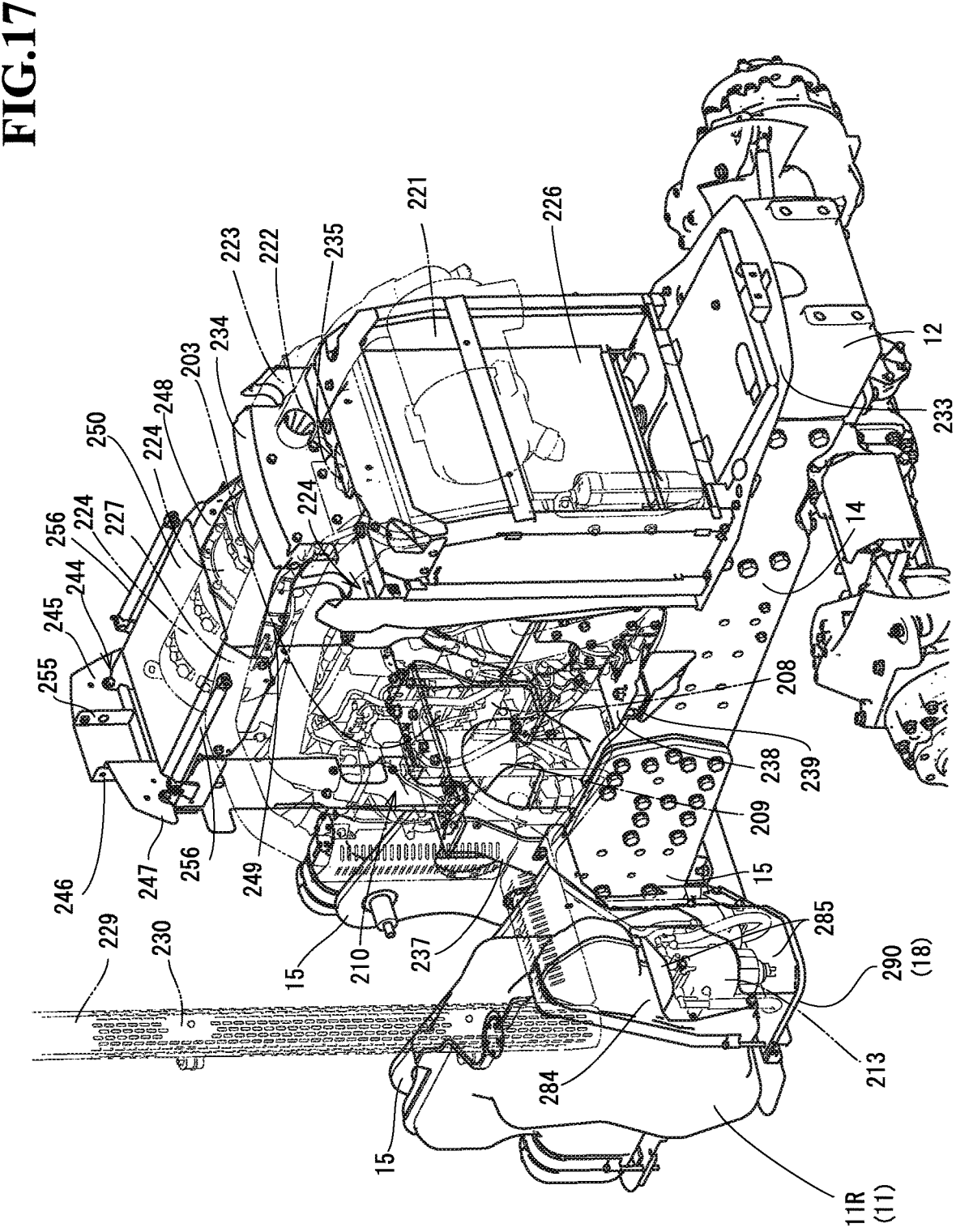
FIG. 17 is a perspective view illustrating the internal structure of the engine room as viewed in a diagonal direction from a front right side.
Figure 18:
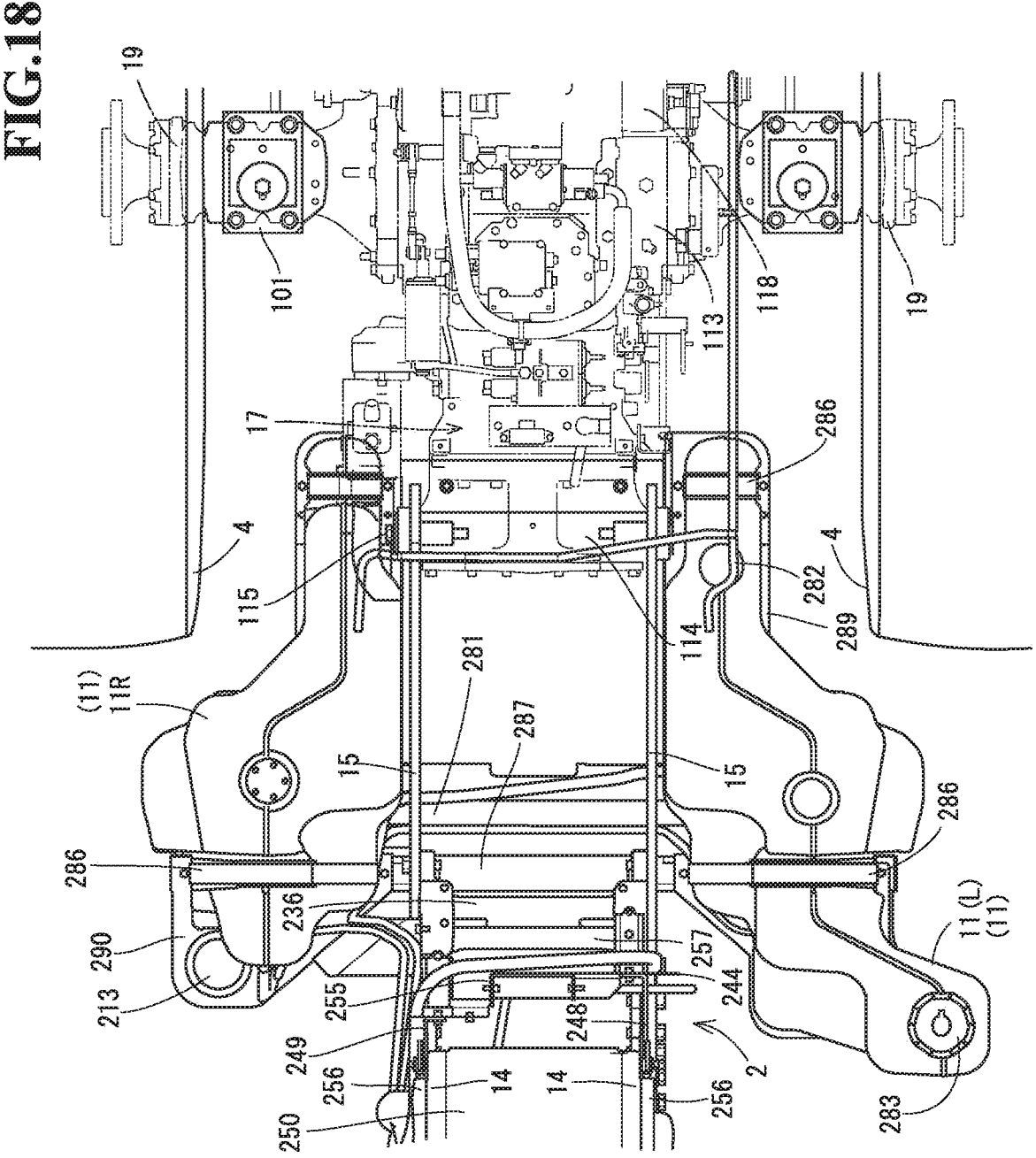
FIG. 18 is an enlarged plan view illustrating a structure around a fuel tank.
Figure 19:
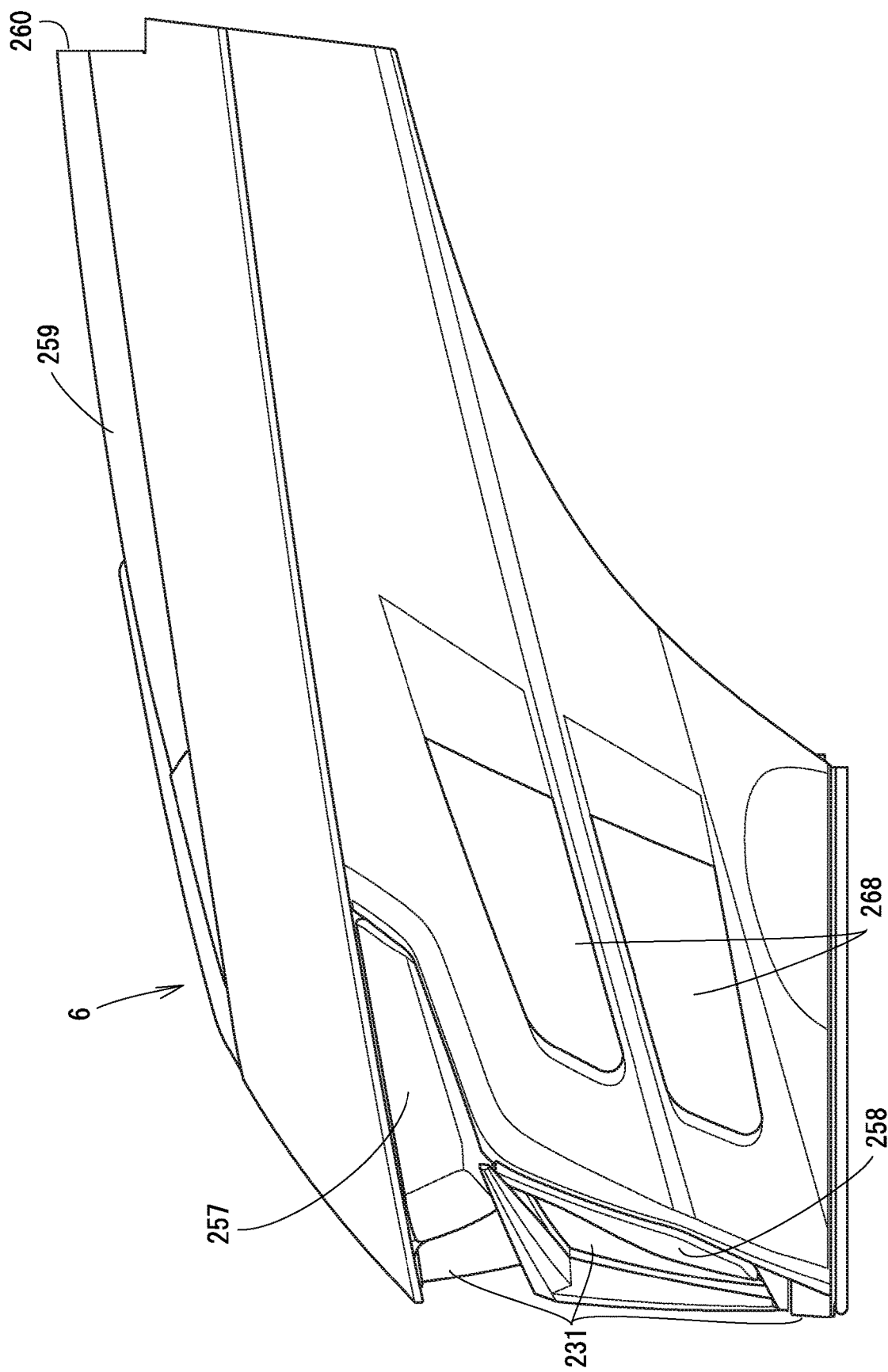
FIG. 19 is a left side view of a hood.
Figure 20:
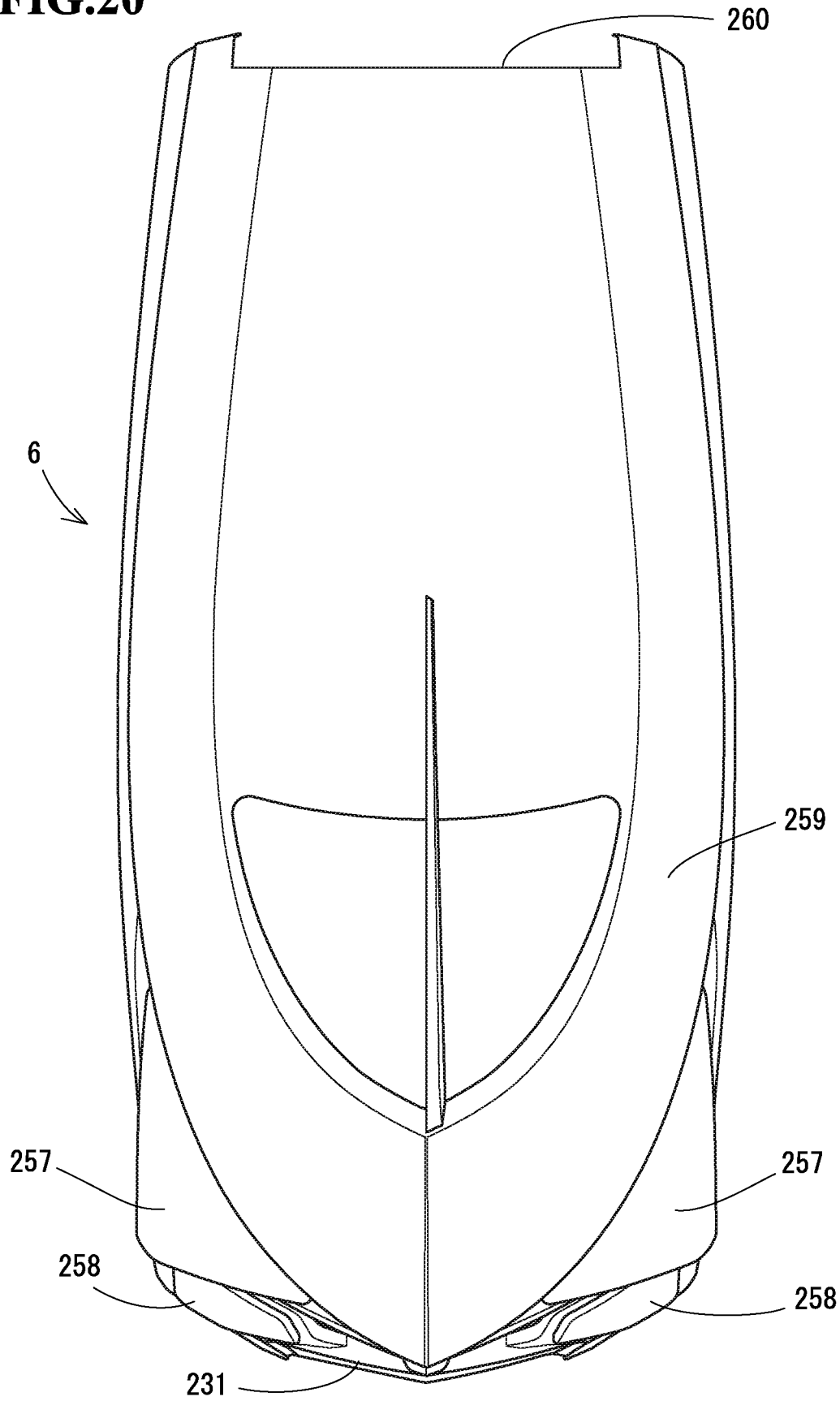
FIG. 20 is a plan view of the hood.
Figure 21:
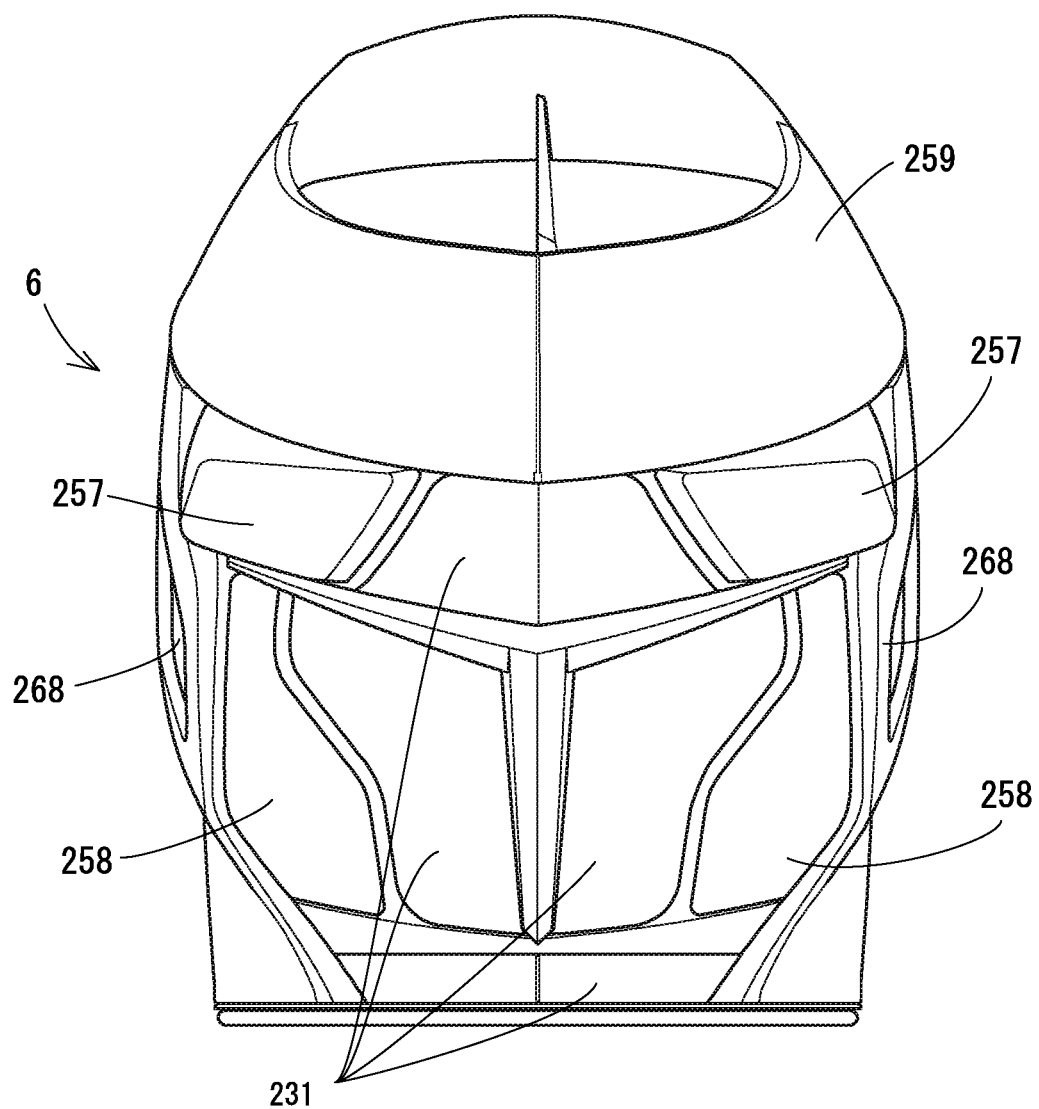
FIG. 21 is a front view of the hood.
Figure 22:
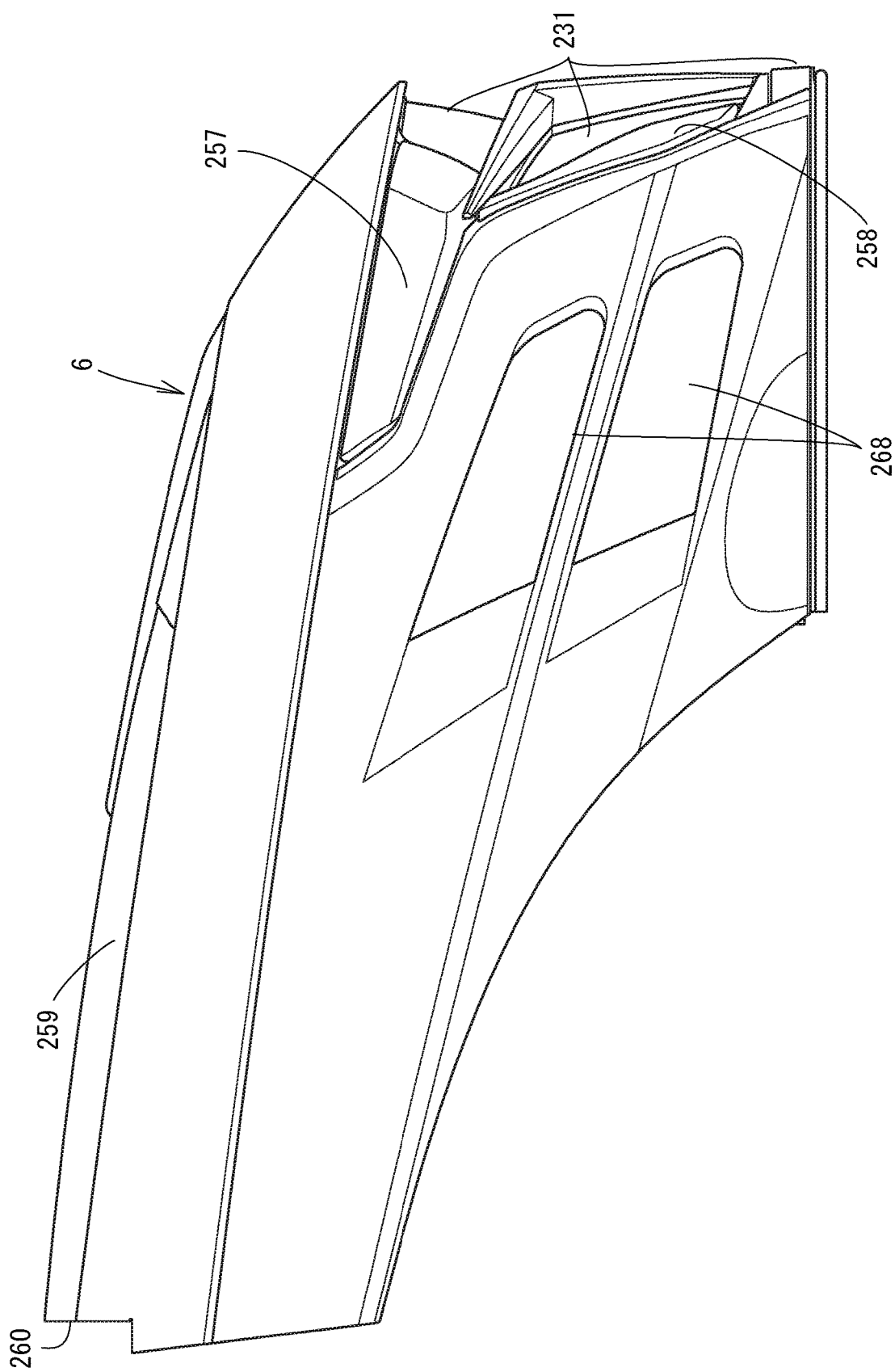
FIG. 22 is a right side view of the hood.

An embodiment of the invention of the present application is described with reference to the drawings with a tractor as an example of a working vehicle.

First of all, an overview of a tractor 1 is described with reference to FIGS. 1 to 11. A travelling vehicle 2 of the tractor 1 according to the embodiment is supported by a pair of left and right front wheels 3 and a pair of left and right rear wheels 4 serving as a travelling unit. The tractor 1 travels forward and backward when the front and the rear wheels 3 and 4 are driven by a common rail diesel engine 5 (hereinafter, simply referred to as an engine) serving as a source of driving force that is installed in a front portion of the travelling vehicle 2. The engine 5 is covered by a hood 6. A cabin 7 is disposed on an upper surface of the travelling vehicle 2, and incorporates a driver's seat 8 and a steering wheel (round steering wheel) 9. A steering operation on the steering wheel 9 turns a steering direction of the front wheels 3 left and right. Steps 10, used by the operator to enter and exit the vehicle, are provided at outer lower portions of the cabin 7. A fuel tank 11 from which fuel is supplied to the engine 5 is provided below a bottom portion of the cabin 7.

The travelling vehicle 2 includes: an engine frame 14 including a front bumper 12 and a front axle case 13; and left and right body frames 15 detachably fixed to a rear portion of the engine frame 14. A front axle 16 rotatably protrudes outward from both left and right end sides of the front axle case 13. The front wheels 3 are attached to both left and right end sides of the front axle case 13 via the front axle 16. A mission case 17 is coupled to a rear portion of the body frame 15. The mission case 17 is used for transmitting rotary driving force from the engine 5 as a result of appropriate speed change to the four front and rear wheels 3, 3, 4, and 4. A tank frame 18 is bolted onto a lower surface side of the left and the right body frames 15 and the mission case 17. The tank frame 18 protrudes outward towards the left and the right and has a shape of a rectangular frame plate in bottom view. In the embodiment, two left and right fuel tanks 11 are provided and are respectively disposed on upper surface sides of left and right protruding portions of the tank frame 18. Left and right rear axle cases 19 are attached to the left and the right outer surfaces of the mission case 17 and protrude outward. Left and right rear axles 20 are rotatably inserted in the left and the right rear axle cases 19. The rear wheels 4 are attached to the mission case 17 via the rear axles 20. Upper portions of the left and the right rear wheels 4 are covered with left and right rear fenders 21.

A hydraulic lifting mechanism 22 is detachably attached to an upper surface of a rear portion of the mission case 17, and hoists and lowers a work machine such as a rotary cultivator for example. The work machine such as the rotary cultivator is coupled to a rear portion of the mission case 17 via a three-point linkage mechanism including a pair of left and right lower links 23 and a top link 24. A PTO shaft 25, through which PTO driving force is transmitted to the work machine such as the rotary cultivator, protrudes rearward from a rear surface of the mission case 17.

A flywheel 26 is coupled to an engine output shaft (not illustrated) that protrudes rearward from a rear surface of the engine 5. A main driving shaft 27 and a main transmission input shaft 28 are coupled to each other via a driving force transmitting shaft 29 having universal joints on its both ends. The main driving shaft 27 protrudes rearward from the flywheel 26. The main transmission input shaft 28 protrudes forward from a front surface of the mission case 17 (see FIGS. 1, 7, and 10). The mission case 17 incorporates a hydraulic continuously variable transmission, a forward-backward movement switching mechanism, a travel sub transmission gear mechanism, and a rear wheel differential gear mechanism. The rotary driving force of the engine 5 is transmitted to the main transmission input shaft 28 of the mission case 17, where appropriate speed change is performed by the hydraulic continuously variable transmission and the travel sub transmission gear mechanism, via the main driving shaft 27 and the driving force transmitting shaft 29. The driving force as a result of the speed change is transmitted to the left and the right rear wheels 4 via the rear wheel differential gear mechanism.

A front wheel transmission shaft (not illustrated) protrudes rearward from the front axle case 13, incorporating a front wheel differential gear mechanism (not illustrated), and is coupled to a front wheel output shaft 30 protruding forward from a lower portion of a front surface of the mission case 17 via a front wheel driving shaft 31. The driving force as a result of the speed change by the hydraulic continuously variable transmission and the travel sub transmission gear mechanism in the mission case 17 is transmitted to the left and the right front wheels 3 from the front wheel output shaft 30, the front wheel driving shaft 31, and the front wheel transmission shaft, via the front wheel differential gear mechanism in the front axle case 13.

Next, an internal structure of the cabin 7 is described with reference to FIGS. 1 to 4. A steering column 32 is disposed in a front portion of the driver's seat 8 in the cabin 7. The steering column 32 stands in a state of being buried in a rear surface side of a dashboard 33 disposed on a front surface side in the cabin 7. The steering wheel 9 having a substantially round shape in plan view is attached to an upper end side of a steering wheel shaft protruding upward from the upper surface of the steering column 32.

A one-touch hoisting-and-lowering lever 34 and a pair of left and right brake pedals 35 are disposed on a right side of the steering column 32. The one-touch hoisting-and-lowering lever 34 is used for forcibly moving the work machine such as the rotary cultivator to an upper limit position and a lower limit position. The brake pedals 35 are used for performing a braking operation for the travelling vehicle 2. A forward-backward movement switching lever 36 (reverser lever) and a clutch pedal 37 are disposed on a left side of the steering column 32. The forward-backward movement switching lever 36 is used for performing a switching operation of switching the travelling direction of the travelling vehicle 2 between forward and backward directions. The clutch pedal 37 is used for performing a cut-off operation on a clutch (not illustrated), so that driving force is engaged and disengaged.

A misoperation preventive member 38 (reverser guard) extending along the forward-backward movement switching lever 36 is disposed on a left side of the steering column 32 and below the forward-backward movement switching lever 36. With the misoperation preventive member 38 serving as a contact preventive member disposed below the forward-backward movement switching lever 36, the operator entering and exiting the tractor 1 can be prevented from accidentally contacting the forward-backward movement switching lever 36. An operation display board 39 incorporating a liquid crystal panel is disposed on an upper portion side of a rear surface of the dashboard 33.

An accelerator pedal 41 for controlling engine speed of the engine 5 and vehicle speed is disposed on the right side of the steering column 32 on a floor plate 40 on the front side of the driver's seat 8 in the cabin 7. The floor plate 40 has a substantially entirely planer upper surface. Side columns 42 are disposed on both left and right sides of the driver's seat 8. A parking brake lever 43, an-ultra low speed lever 44 (creep lever), a sub transmission lever 45, and a PTO transmission lever 46 are disposed between the driver's seat 8 and the left side column 42. The parking brake lever 43 is used for performing an operation of maintaining a braking state of both left and right rear wheels 4. The an-ultra low speed lever 44 is used for forcibly and largely reducing the travelling speed (vehicle speed) of the tractor 1. The sub transmission lever 45 is used for switching an output range of the travel sub transmission gear mechanism in the mission case 17. The PTO transmission lever 46 is used for performing a switching operation for the driving speed of the PTO shaft 25. A diff-lock pedal 47 used for turning ON/OFF differential driving of both left and right rear wheels 4 is disposed below the driver's seat 8. A reverse PTO lever 48 for executing an operation of reversely driving the PTO shaft 25 is disposed on a rear and left side of the driver's seat 8.

An armrest 49 on which the operator sitting on the driver's seat 8 rests his or her arm and elbow is disposed between the driver's seat 8 and the left side column 42. The armrest 49 is formed as a member separate from the driver's seat 8, and includes a main transmission lever 50 and an operation position dial 51 (hoisting-lowering dial). The main transmission lever 50 is used for increasing/reducing the travelling speed of the tractor 1. The operation position dial 51 is a dial for manually changing and adjusting the height position of the work machine such as a rotary cultivator. The armrest 49 can be pivoted upward by a plurality of stages about a lower portion of its rear end.

A throttle lever 52, a PTO clutch switch 53, and a plurality of hydraulic operation levers 54 (SCV levers) are disposed on the left side column 42 in this order from the front side. The throttle lever 52 is used for setting and maintaining the engine speed of the engine 5. The PTO clutch switch 53 is used for performing control of transmitting and cutting off the driving force from the PTO shaft 25 to the work machine such as the rotary cultivator. The hydraulic operation levers 54 are used for performing an operation of switching among hydraulic externally supplying valves (sub-control valve not illustrated) disposed on the upper surface side of the mission case 17. The hydraulic externally supplying valve is used for performing an operation of supplying hydraulic oil to another work machine such as a front loader retrofitted to the tractor 1. In the embodiment, the number of hydraulic operation levers 54 is four that is the same as the number of hydraulic externally supplying valves (four).

In the diesel engine 5, a cylinder head is disposed on a cylinder block incorporating an engine output shaft and a piston, an intake manifold 203 is disposed on a right side surface of the cylinder head, and an exhaust manifold 204 is disposed on a left side surface of the cylinder head. Thus, the intake manifold 203 and the exhaust manifold 204 are respectively disposed on both side surfaces along the engine output shaft in the engine 5. In the diesel engine 5, a cooling fan 206 is disposed on a front surface of the cylinder block and the flywheel 26 is disposed on a rear surface of the cylinder block. Thus, in the engine 5, the flywheel 26 and the cooling fan 206 are respectively disposed on both side surfaces orthogonal to the engine output shaft.

The diesel engine 5 has a right side surface provided with a fuel supply pump 207, a common rail 208, a fuel filter 209, and an EGR device 210. The fuel supply pump 207 is used for supplying fuel. The common rail 208 has a cylindrical shape and is used for pumping the fuel to injectors. The fuel filter 209 is used for removing foreign matters from the fuel from the fuel tank 11. The EGR device 210 is coupled to the intake manifold 203. The fuel from the fuel tank 11 is supplied to the fuel supply pump 207 via the fuel filter 209 by a fuel pump 213, and then is pumped to the common rail 208 from the fuel supply pump 207. Thus, high pressure fuel is stored in the common rail 208. In this state, by performing ON/OFF control on a fuel injection valve of each injector, the high pressure fuel in the common rail 208 is injected into each cylinder of the engine 5 from a corresponding one of the injectors.

The diesel engine 5 has a left side surface provided with a turbo supercharger 211 and an EGR cooler 212. The turbo supercharger 211 compresses air with exhaust gas from the exhaust manifold 204. The EGR cooler 212 cools a part of the exhaust gas from the exhaust manifold 204 so that the resultant exhaust gas is recirculated to the EGR device 210. The turbo supercharger 211 includes a compressor case incorporating a blower wheel. The compressor case has an intake air intake side connected to an intake air discharge side of an air cleaner 221 via an intake pipe 222, and has an intake air discharge side connected to an intake joint pipe (intake upstream side) 223. The turbo supercharger 211 includes a turbine case incorporating a turbine wheel. The turbine case has a discharge air intake side coupled to an exhaust gas outlet of the exhaust manifold 204, and has an intake air discharge side coupled to an exhaust gas inlet of an exhaust gas purification device 224 serving as a post-processing device.

In the diesel engine 5, the EGR cooler 212 and the EGR device 210, respectively disposed on both side surfaces, are connected to each other via a recirculation exhaust gas pipe serving as a reflux pipe path circumventing the rear surface (side of the flywheel 26) of the engine 5. The EGR device 210 is connected to an intake joint pipe (intake downstream side) 225 on the right side of the engine 5. The intake joint pipe 225 extends forward (towards the cooling fan 206). The intake joint pipes 223 and 225 are respectively disposed on both side surfaces of the diesel engine 5, and extend towards the forward and upper side of the diesel engine 5 to be connected to an inter cooler (not illustrated) in a frame 226 on the front side of the diesel engine 5. The air cleaner 221 is disposed on an upper side of the front surface of the frame 226, and the intake pipe 222 connected to the air cleaner 221 extends in a rear portion on the left side surface of the diesel engine 5 to be disposed over an upper portion of the frame 226.

In the configuration described above, fresh air (outer air) taken into the air cleaner 221 has dust removed therefrom and purified by the air cleaner 221, and then is sucked into the compressor case of the turbo supercharger 211 via the intake pipe 222. Pressurized fresh air, as a result of the compression by the compressor case of the turbo supercharger 211, is supplied to the EGR main body case of the EGR device 210 via the intake joint pipes 223 and 225 and the inter cooler. On the other hand, the part (EGR gas) of the exhaust gas from the exhaust manifold 204 is cooled by the EGR cooler 212, and then is supplied to the EGR main body case of the EGR device 210 via the recirculation exhaust gas pipe.

The EGR device 210 mixes the pressurized fresh air from the turbo supercharger 211 and the EGR gas from the exhaust manifold 204, and then supplies the resultant mixed gas to the intake manifold 203. Thus, the part of the exhaust gas discharged from the diesel engine 5 to the exhaust manifold 204 is recirculated to the intake manifold 203, whereby the maximum combustion temperature at the time of high load driving can be lowered and the amount of nitrogen oxide (NOx) discharged from the diesel engine 5 can be reduced.

The diesel engine 5 includes the exhaust gas purification device 224 (DPF) of a continuously regenerating type. The exhaust gas purification device 224 removes particulate matter (PM) in the exhaust gas discharged from the engine 5, and reduces carbon oxide (CO) and hydrocarbon (HC) in the exhaust gas. The exhaust gas purification device 224 is disposed at a portion above the exhaust manifold 204 on the upper surface side of the diesel engine 5. The exhaust gas purification device 224 has a substantially cylindrical shape and extends in parallel with the output shaft (crank shaft) of the diesel engine 5 along the front and rear direction. The exhaust gas purification device 224 has front and rear surfaces (upstream and downstream sides in the exhaust gas movement direction) respectively provided with the exhaust gas inlet and the exhaust gas outlet.

The exhaust gas purification device 224 has a case outer circumference surface, on one side (rear side) of its longitudinal direction, provided with the exhaust gas inlet connected to an exhaust gas discharge side of the turbine case of the turbo supercharger 211. The exhaust gas purification device 224 has a case outer circumference surface, on the other side (front side) of its longitudinal direction, provided with the exhaust gas outlet connected to the exhaust pipe 227. In the exhaust gas purification device 224, the exhaust gas inlet is open downward, and the exhaust gas outlet is open upward towards the right side. The exhaust pipe 227 extends from the front and left side to the rear and right side of the diesel engine 5 to be disposed over an upper portion of the diesel engine 5.

The exhaust gas purification device 224 and the exhaust pipe 227 are disposed side by side above the diesel engine 5 while being in parallel with the output shaft of the diesel engine 5. Thus, the exhaust gas purification device 224 and the exhaust pipe 227 are arranged side by side in such a manner that the exhaust gas purification device 224 covers the left side of the upper surface of the diesel engine 5 and the exhaust pipe 227 covers the right side of the upper surface of the diesel engine 5.

The exhaust pipe 227 connected to the discharge side of the exhaust gas purification device 224 is connected to a tail pipe 229 via a bellows pipe 228 standing on a rear and right side of the diesel engine 5. The tail pipe 229 has a shape extending upward from a lower side on the front and right side of the cabin 7 and bent towards the diesel engine 5 below the cabin 7. The tail pipe 229 has a lower bent portion extending from the inner side to the outer side to be disposed over the body frame 15. The tail pipe 229 has a portion other than its upper end portion covered with a heat shield plate 230.

Next, a configuration of an engine room frame below the hood 6 is described with reference to FIGS. 12 to 17. The hood 6 has a front grille 231 that is formed on a front and lower side and covers the front side of the engine room. Engine covers 232, each formed of a porous plate, are disposed on lower left and right sides of the hood 6, and covers left and right sides of the engine room. Thus, the diesel engine 5 has the front, upper, left, and right sides covered with the hood 6 and the engine covers 232.

A frame bottom plate 233 bridges between the upper edges of the engine frame 14 and the front bumper 12 on left and right sides to be disposed above the front side portions of the engine frames 14. A radiator 235 with a fan shroud 234 attached to its rear surface side stands on the frame bottom plate 233 in such a manner as to be positioned on the front surface side of the engine 5. The fan shroud 234, through which the radiator 235 and the cooling fan 206 are communicated with each other, surrounds an outer circumference side of the cooling fan 206. The frame 226 having a shape of a rectangular frame stands on the frame bottom plate 233 on the front surface side of the radiator 235.

The frame 226 has the rear surface covered with the radiator 235, and has a front surface and left and right side surfaces covered with meshed plates. The frame 226 accommodates the inter cooler described above, as well as an oil cooler, a fuel cooler, and the like. The air cleaner 221 is disposed at an upper position of the front surface of the frame 226. Thus, cooling air sucked in through the front grille 231 flows towards the frame 226 behind the front grille 231 to cool the air cleaner 221 and to cool the inter cooler, the oil cooler, and the fuel cooler in the frame 226. The cooling air from the front side reaches the radiator 235 on the rear surface of the frame 226 so that a high cooling effect for cooling water supplied to the diesel engine 5 can be achieved.

The pair of left and right body frames 15 are coupled to a front and lower side of the floor plate 40 via a support beam frame 236. The support beam frame 236 is bolted to each of the left and the right body frames 15 in such a manner as to bridge between the left and the right body frames 15. An engine support frame 237 is mounted on the upper surface of the support beam frame 236. The engine support frame 237 has a lower end surface bolted to the upper surface of the support beam frame 236, whereby the flywheel 26 of the diesel engine 5 is surrounded by the engine support frame 237 and the support beam frame 236.

The diesel engine 5 has engine leg attachment portions (not illustrated) disposed on lower sides of the left and the right side surfaces coupled to intermediate portions of the pair of left and right engine frames 14 via engine legs 238 each including an anti-vibration rubber piece 239. The diesel engine 5 has engine leg attachment portions (not illustrated) disposed on a rear surface coupled to the upper surface of the engine support frame 237 via engine legs 240 each including an anti-vibration rubber piece 241.

The engine legs 238 are bolted onto the outer sides of the intermediate portions of the pair of left and right engine frame 14, whereby the diesel engine 5 is clamped and supported by the engine frame 14. The rear surface of the diesel engine 5 is coupled to front end sides of the pair of left and right body frames 15 via the support beam frame 236, the engine support frame 237, and the engine legs 240. Thus, the rear side of the diesel engine 5 is supported by the front end of the body frame 15. The diesel engine 5 is supported by the travelling vehicle 2 via the left and the right front anti-vibration rubber pieces 239 and the left and the right rear anti-vibration rubber pieces 241.

A pair of left and right column frames 242 and 243 stand on the upper surface of the engine support frame 237 in such a manner as to clamp the engine leg 240 from left and right sides. More specifically, the left side column frame 242 stands at a position on a rear left side of the engine leg 240, and the right side column frame 242 stands at a position on a front right side of the engine leg 240. A hood shield plate (shield plate) 244 covering the rear side of the hood 6 is coupled to the pair of left and right column frames 242 and 243 in such a manner as to have its lower edge separated from the upper surface of the engine leg 240.

The hood shield plate 244 has a bent shape in plan view. More specifically, the hood shield plate 244 includes a rear shield surface 245, a side shield surface 246, and a connection surface 247. The rear shield surface 245 extends rightward in substantially parallel with a front surface of a windshield 321 from the outer side (left side) of the left side column frame 242. The side shield surface 246 is formed by bending the rear shield surface 245 to extend from its right edge towards the front side. The connection surface 247 is formed by bending the side shield surface 246 to extend from its front edge towards the right side and is connected to the right side column frame 243. The rear shield surface 245 is connected to the left side column frame 242 and has a left edge protruding outward (towards the left side) beyond the left side column frame 242, and is separated from the front surface of the windshield 321. The side shield surface 246 is disposed on the right side on the upper surface of the engine leg 240. The connection surface 247 is coupled to the right side column frame 243 in such a manner as to have a right edge matching the front surface of the right side column frame 243.

The hood shield plate 244 is disposed on the inner side and the rear surface side of the hood 6, and covers at least the rear surfaces of the exhaust gas purification device 224 and the exhaust pipe 227. The hood shield plate 244 has the shape protruding towards the left side of the left side column frame 242 to cover at least the rear surface of the diesel engine 5 on the left side (side of the exhaust manifold 204). The hood shield plate 244 has both edges connected to the pair of left and right column frames 242 and 243, and thus covers the entire rear surface of the diesel engine 5. On the rear surface side of the hood 6, an area on the right side of the hood shield plate 244 is open, and the bellows pipe 228 connected to the exhaust pipe 227 and a part of the tail pipe 229 are disposed in this area.

The rear surface of the hood 6 is covered with the hood shield plate 244 so that heat from the engine room below the hood 6 is shielded by the hood shield plate 244, whereby the side of the cabin 7 can be prevented from being heated by the heat discharged from the engine room. Thus, the operator in the cabin 7 can comfortably operate the vehicle without being negatively affected by the heat discharged from the diesel engine 5 and the exhaust gas purification device 224. The hood shield plate 244 is disposed while being separated from the front surface of the cabin 7 so that a heat insulation layer is formed between the hood shield plate 244 and the cabin 7 disposed behind the hood 6.

The hood shield plate 244 includes the rear shield surface 245 having recesses and protrusions of a predetermined pattern to shutoff sound produced from the engine room below the hood 6. With the recesses and the protrusions formed on the hood shield plate 244, the noise produced from the diesel engine 5 and the like in the engine room below the hood 6 can be attenuated, whereby the noise can be prevented from propagating into the cabin 7.

A pair of left and right beam frames 248 and 249 each bridge respective upper portions of the fan shroud 234 and the hood shield plate 244. The left side beam frame 248 has one end (rear end) coupled to the left side column frame 242 via the rear shield surface 245 of the hood shield plate 244. The right side beam frame 249, shorter than the left side beam frame 248, has one end (rear end) coupled to the right side column frame 243 via the connection surface 247 of the hood shield plate 244. The pair of left and right beam frames 248 and 249 each have the other end coupled to an upper portion of the rear surface of the fan shroud 234. The fan shroud 234 and the hood shield plate 244 stably supported by the travelling vehicle 2 are coupled to each other by being bridged by the pair of beam frames 248 and 249. With these members thus integrated, an engine room frame body rigid as a whole can be achieved.

A heat shield plate 250 is provided that has both left and right edges fixed to the pair of left and right beam frames 248 and 249. The heat shield plate 250 bridges between the beam frames 248 and 249 in such a manner as to cover an intermediate portion and the rear side of each of the beam frames 248 and 249 below the hood 6. The heat shield plate 250 is disposed to cover the upper portions of the exhaust gas purification device 224 and the exhaust pipe 227 above the diesel engine 5. The heat shield plate 250 is fixed to bridge between the beam frames 248 and 249, to reinforce the beam frames 248 and 249, whereby a more rigid engine room frame structure can be achieved. The heat shield plate 250 is disposed between the hood 6 and the exhaust gas purification device 224 and the exhaust pipe 227, whereby the hood 6 can be prevented from being heated by the heat discharged from the engine room.

The heat shield plate 250 is disposed between the hood 6 and the exhaust gas purification device 224 that is installed above the diesel engine 5 at a position on the rear inner side of the hood 6. The heat shield plate 250 is disposed above the exhaust gas purification device 224 so that the hood 6 can be prevented from being heated by the heat discharged from the exhaust gas purification device 224 and the diesel engine 5. The space is formed between the hood 6 and the heat shield plate 250 so that the inner side of the engine room below the heat shield plate 250 is thermally insulated from the outer air, whereby the exhaust gas purification device 224 can operate in a high temperature environment.

The hood shield plate 244 is provided in addition to the heat shield plate 250. The hood shield plate 244 is disposed on the rear surface side of the hood 6 and covers at least the rear surface of the exhaust gas purification device 224. The heat from the engine room below the hood is shielded with the heat shield plate 250 and with the hood shield plate 244. Thus, the inner side of the cabin 7 can be prevented from being heated by the heat discharged from the engine room. With the hood shield plate 244 and the heat shield plate 250 disposed with a gap in between, the heat is less likely to accumulate in the engine room below the hood 6. Thus, the exhaust gas purification device 224 can be prevented from being negatively affected by its own heat or from negatively affecting the hood 6 or the like by the heat discharged therefrom.

The diesel engine 5 mounted in a front portion of the travelling vehicle 2, the exhaust gas purification device 224 that is disposed above the diesel engine 5 and purifies exhaust gas from the diesel engine 5, and the cooling fan 206 for cooling the diesel engine 5 are provided. The cooling fan 206 is disposed on a front surface side of the diesel engine 5. The fan shroud 234 that covers the cooling fan 206 is fixed to the travelling vehicle 2. The hood 6 covers the cooling fan 206, the diesel engine 5, and the exhaust gas purification device 224. The hood shield plate 244 that covers a rear side of the diesel engine 5 is disposed on a rear surface of the hood 6. The hood shield plate 244 is fixed to the travelling vehicle 2. The pair of left and right beam frames 248 and 249 each bridge between respective upper portions of the fan shroud 234 and the hood shield plate 244.

A wiper 251 that wipes off water drops on the windshield 321 is pivotally attached to the windshield 321. The wiper 251 has a driving shaft 252 inserted into the cabin 7 through the windshield 321, and pivots about the driving shaft 252. The driving shaft 252 of the wiper 251 has its front side covered with the rear shield surface 245 of the hood shield plate 244. The driving shaft 252 of the wiper 251, which performs a wiping operation on the windshield 321 covering the front surface of the cabin 7 in the travelling vehicle 2, is covered with a rear portion of the upper surface the hood 6 in front view. Thus, rain drops can be prevented from directly coming into contact with the driving shaft 252 and a driving mechanism of the wiper 251, and a better appearance can be achieved.

A through hole 253 is formed in a part of the windshield 321. A hydraulic pump 254 supported in the cabin 7 protrudes out of the cabin 7 through the through hole 253. The through hole 253 is disposed at a position facing the connection surface 247 of the hood shield plate 244. Thus, the hydraulic pump 254 protruding out of the cabin 7 through the through hole 253 can be prevented from interfering with the hood shield plate 244. The hydraulic pump 254 has a front surface covered with the hood shield plate 244 so as not to be heated by the heat from the engine room in the hood 6.

Figure 23:
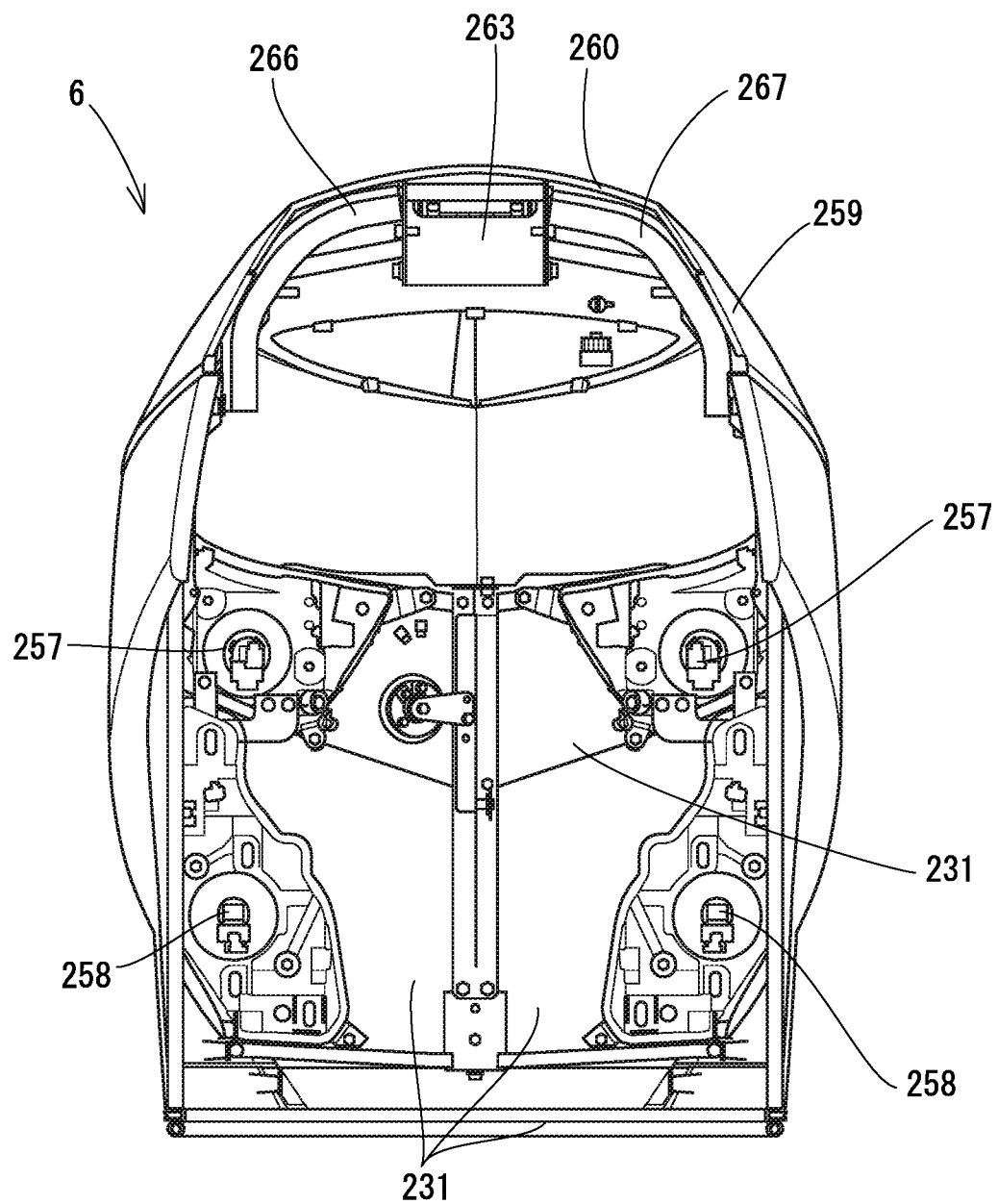
FIG. 23 is a rear view of the hood.
Figure 24:
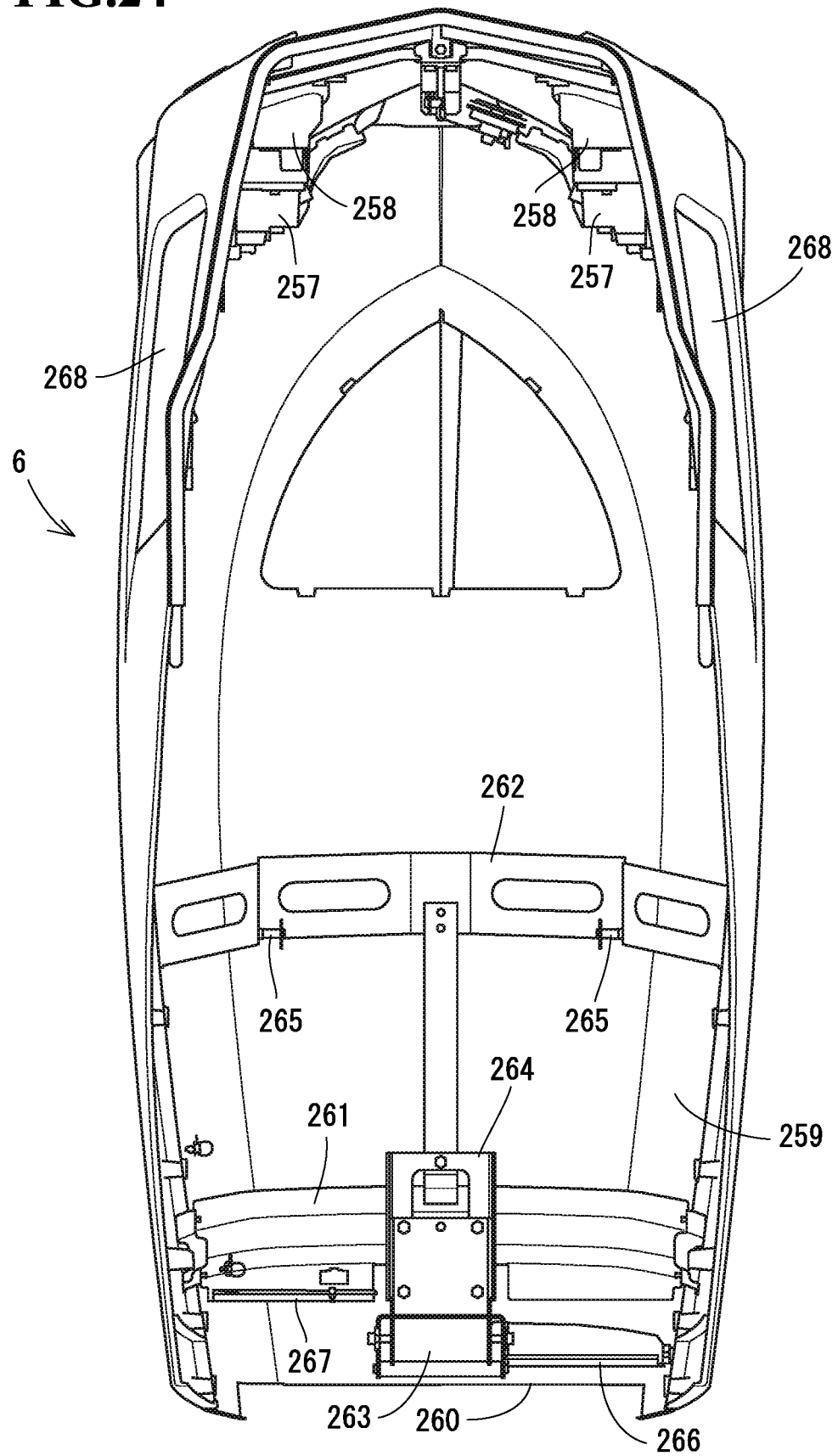
FIG. 24 is a bottom view of the hood.

A hood support bracket 255 that pivotally supports the rear side of the hood 6 is disposed on an upper edge of the front surface of the hood shield plate 244. The hood support bracket 255 has a shape with both left and right edges bent, and is fixed to the rear shield surface 245 and the side shield surface 246 of the hood shield plate 244. Thus, the hood support bracket 255 has the rear surface connected to the rear shield surface 245 and has a side surface, formed by bending the right edge side, connected to the side shield surface 246. A hinge 263 (see FIGS. 23 and 24) is provided to an upper end of the hood support bracket 255. The hinge 263 comes into contact with, supports, and pivots with the hood 6.

Gas springs 256 and 256 that can be stretched and compressed are respectively disposed on both left and right sides of the heat shield plate 250 below the hood 6. The pair of left and right gas springs 256 and 256 each have one end (rear end) pivotally connected to a rear end side of a corresponding one of the pair of left and right beam frames 248 and 249, and have the other end (front end) pivotally connected to an inner side surface of the upper portion of the hood 6. Thus, when the front portion of the hood 6 is lifted, the hood 6 pivots about the upper end position of the hood shield plate 244, so that maintenance work for the diesel engine 5 and the like can be performed.

As illustrated in FIGS. 19 to 24, the hood 6 includes: the front grille 231 at a center position of its front surface; and headlights 257 and 258 at upper and lower portions on both left and right sides of the front grille 231. A roof portion 259 on an upper side of the hood 6 has an inclined shape to extend diagonally upward from the front side to the rear side. Thus, a large space is formed on a rear lower side of the roof portion 259, whereby a large space can be formed for accommodating the exhaust gas purification device 224 in the engine room in the hood 6. The hood 6 has openings 268 on both side surfaces on the front side, and the cooling air is introduced from both left and right sides of the hood 6 through the openings 268.

The heat shield plate 250 covering the upper side of the exhaust gas purification device 224 and the roof portion 259 of the hood 6 are separated from each other by a sufficient distance so that a space is formed, whereby an excellent heat balance can be maintained in the engine room. The front grille 231 for taking in the cooling air is disposed at a wide area at the center of the front surface of the hood 6. Thus, the cooling air can be suitably supplied into the engine room, whereby the heat can be prevented from accumulating in the hood 6. Furthermore, the openings 268 are provided on both side surfaces of the hood 6, whereby an optimum cooling structure in the engine room below the hood 6 can be achieved.

The engine covers 232, having an entirely punched surface, are disposed in wide areas on lower-rear left and right sides of the hood 6. Thus, the air heated by the diesel engine 5 and the exhaust gas purification device 224 can be discharged outside. On the other hand, the engine covers 232 each have the upper end positioned below the exhaust gas purification device 224, whereby the exhaust gas purification device 224 can be aided by a higher temperature retaining effect provided by the hood 6 to be capable of performing a regeneration operation under high temperature.

The roof portion 259 of the hood 6 has a shape with a notch 260 provided at its rear edge. The driving shaft 252 of the wiper 251 is disposed on a rear side of the notch 260. Thus, the driving shaft 252 is covered with the rear portion of the roof portion 259 of the hood 6 in front view of the hood 6. The hood 6 includes a rear frame 261 and an intermediate frame 262 fixed to the back surface of the roof portion 259. The rear frame 261 extends in a lateral direction to bridge between rear sides of the roof portion 259. The intermediate frame 262 extends in a lateral direction to bridge between intermediate portions of the roof portion 259.

On the rear surface side of the roof portion 259, a rail member (support member) 264 is disposed at the center position of the rear frame 261. The rail member 264 fits the outer side of the hinge 263 of the hood support bracket 255 in a slidable manner. On the back surface side of the roof portion 259, a shield plate 266 is disposed at a position on a left side of the rear end of the hinge 263 and a shield plate 267 is disposed at a position on a right side of the rear end of the rail member (support member) 264. The shield plate 266 is provided for extending the upper side of the rear shield surface 245 of the hood shield plate 244, whereas the shield plate 267 is provided for extending the connection surface 247 of the hood shield plate 244. Shafts 265 are disposed on both left and right sides of the intermediate frame 262 and are pivotally supported to the other ends (front ends) of the gas springs 256.

As illustrated in FIGS. 11 to 18, the fuel tank 11 includes a left side tank 11L and a right side tank 11R that are disposed more on the inner side (a side of the body frame 15) than the pair of left and right steps 10 and the rear wheels 4, on the lower side of the floor plate 40 of the cabin 7. The left side tank 11L and the right side tank 11R are respectively disposed on left and right sides in such a manner as to clamp the pair of body frames 15. More specifically, the left side tank 11L has a front portion disposed between the left side body frame 15 and the left side step 10, and has a rear portion disposed between the left side body frame 15 and the left side rear wheel 4. Similarly, the right side tank 11R has a front portion disposed between the right side body frame 15 and the right side step 10, and has a rear portion disposed between the right side body frame 15 and the right side rear wheel 4. The pair of left side tank 11L and right side tank 11R have different capacities, have the lower portions in communication with each other through a fuel communication pipe 281, and have the upper portions communicated with each other via an air communication pipe 282.

The left side tank 11L with a larger capacity has a shape for covering the front side of the left side step 10 on the front side of the cabin 7, and includes a fuel filler 283 on an upper surface on the front side of the step 10. Thus, the left side tank 11L is disposed to cover the right side and the front side of the left side step 10. The fuel filler 283 formed in the left side tank 11L is disposed at a position near the left side step 10, and thus the operator can go up the left side step 10 and perform a fuel supplying operation to the fuel tank 11, whereby the fuel supply operation can be facilitated. The fuel tank 11 is disposed more on the inner side than the steps 10 and the rear wheels 4, and thus can be prevented from directly colliding with an object outside the vehicle. Thus, a damage and the like on the fuel tank 11 can be prevented.

The right side tank 11R with a smaller capacity has a recess 284 formed at its front portion. The fuel pump 213 is disposed on the front side of the recess 284. The fuel pump 213 supplies fuel in the fuel tank 11 into the diesel engine 5. The fuel pump 213 is protected with its outer circumference and an upper side covered with a plate 285 standing from the tank frame 18. The fuel pump 213 is coupled to the recess 284 of the right side tank 11R via the plate 285 covering rear and upper sides of the fuel pump 213. The fuel pump 213 is connected to the left side tank 11L and to the fuel filter 209 of the diesel engine 5. Thus, the fuel can be supplied to the diesel engine 5 from the left side tank 11L with a larger capacity via the fuel pump 213.

The fuel tank 11 includes the pair of left side tank 11L and right side tank 11R that are different from each other in capacity, respectively disposed on left and right sides of the travelling vehicle 2, and are in communication with each other via the fuel communication pipe 281. The fuel filler 283 is disposed on the front portion side of the left side tank 11L with a larger capacity, and the recess 284 is disposed in the front portion of the right side tank 11R with a smaller capacity. The fuel pump 213 is disposed in the recess 284. The fuel is supplied to the diesel engine 5 from the left side tank 11L via the fuel pump 213. Thus, the fuel tank 11 including the left side tank 11L and the right side tank 11R can have a largest possible capacity, and the fuel pump 213 can be disposed close to the diesel engine 5.

The fuel tank 11 is placed on the tank frame 18 protruding outward towards the left and the right on the lower side of the body frame 15, and is fixed by bands 286. The tank frame 18 has a shape of a rectangular frame plate in bottom view, and includes: a front side beam frame 287 suspended from and fixed to the left and the right body frames 15; a rear side beam frame 288 fixed to the lower surface of the mission case 17; and left and right tank placing plates 289 and 290 fixed to both ends of the beam frames 287 and 288. The left and the right tank placing plates 289 and 290 each have substantially the same shape as the bottom surface shape of a corresponding one of the left side tank 11L and the right side tank 11R. The left side tank 11L and the right side tank 11R placed on upper surfaces of the left and the right tank placing plates 289 and 290 each have two portions on front and rear sides bundled to be fixed by the bands 286.

The pair of left and right body frames 15 have front portions respectively coupled to rear portions of the pair of left and right engine frames 14. The portions (tank supporting plates) of the tank frame 18 are coupled to each other via the pair of front and rear beam frames 287 and 288, and support the left side tank 11L and the right side tank 11R from below with the mission case 17 disposed between the rear portions of both body frames 15. The beam frames 287 and 288 are coupled to both body frames 15 and the mission case 17 from below.

The configurations of the components in the present invention are not limited to those in the embodiment in the figures, and can be changed in various ways without departing from the gist of the present invention.

The embodiments of the invention relates to a working vehicle such as a tractor for a farm work and a wheel loader for a construction work.

What is claimed is:

1. A working vehicle comprising:
an engine mounted in a front portion of the working vehicle;
a heat shield plate; and
a post-processing device configured to purify exhaust gas from the engine,
wherein the engine and the post-processing device are covered with a hood,
wherein an upper surface side of the hood is inclined to extend diagonally upward from a front side to a rear side,
wherein the post-processing device is mounted on an upper side of the engine, and is positioned on a rear and inner side of the hood, and
wherein the post-processing device extends in parallel with an output shaft of the engine, the heat shield plate is disposed between the hood and the post-processing device, and at least a portion of the heat shield plate is disposed in a center of a lower side of the hood, and the heat shield plate covers an upper surface of each of the engine and the post-processing device.

2. The working vehicle according to claim 1, wherein a driving shaft of a wiper configured to perform a wiping operation for a windshield covering a front surface of a cabin installed in the working vehicle is covered by a rear portion of an upper surface of the hood in front view.

3. The working vehicle according to claim 1, further comprising a hood shield plate that is disposed on a rear surface side of the hood, and is configured to cover at least a rear surface of the post-processing device, wherein a gap is provided between the hood shield plate and the heat shield plate.

4. The working vehicle according to claim 1, wherein the post-processing device is configured to remove particulate matter in the exhaust gas.

5. The working vehicle according to claim 4, wherein the post-processing device is further configured to reduce carbon monoxide and hydrocarbon in the exhaust gas.

6. The working vehicle according to claim 1, wherein the post-processing device comprises a diesel particulate filter.

7. The working vehicle according to claim 1, wherein:
the post-processing device comprises an exhaust gas purification device; and
the exhaust gas purification device comprises an exhaust gas inlet and an exhaust gas outlet.

8. The working vehicle according to claim 7, wherein the exhaust gas inlet is open downward and the exhaust gas outlet is open upwards.

9. The working vehicle according to claim 7, further comprising an exhaust pipe connected to the exhaust gas outlet.

10. The working vehicle according to claim 9, further comprising:
an operating seat; and
a hood shield plate positioned between the operating seat and the post-processing device; and
wherein the exhaust pipe extends from the post-processing device toward the operating seat and past an edge of the hood shield plate.

11. The working vehicle according to claim 10, further comprising:
a hood support bracket coupled to a surface of the hood shield plate, the surface of the hood shield plate facing a rear surface of the post-processing device; and
wherein the hood is coupled to the hood shield plate via the hood support bracket.

12. The working vehicle according to claim 9, wherein the post-processing device and the exhaust pipe are arranged side by side in a lateral direction such that the post-processing device covers a left side of the upper surface of the engine and the exhaust pipe covers a right side of the upper surface of the engine.

13. The working vehicle according to claim 9, wherein:
the post-processing device and a portion of the exhaust pipe are arranged side by side such that the post-processing device is parallel to the portion of the exhaust pipe; and
the heat shield plate covers an upper surface of the portion of the exhaust pipe.

14. The working vehicle according to claim 1, wherein the heat shield plate covers an entirety of a portion of an upper surface of each of the engine and the post-processing device in a left-right direction.

15. The working vehicle according to claim 14, wherein the heat shield plate comprises a left and right edge fixed to a pair of left and right beam frames.

16. The working vehicle according to claim 15, wherein the heat shield plate extends from a first lateral side of the hood to a second lateral side of the hood such that a central portion of the heat shield plate is disposed below a portion of a center of the hood.

* * * * *